US 11,328,441 B2

(12) United States Patent
Suzuki et al.

(10) Patent No.: US 11,328,441 B2
(45) Date of Patent: May 10, 2022

(54) INFORMATION PROCESSING DEVICE AND INFORMATION PROCESSING SYSTEM

(71) Applicants: Kabushiki Kaisha Toshiba, Minato-ku (JP); Toshiba Infrastructure Systems & Solutions Corporation, Kawasaki (JP)

(72) Inventors: Yoshihiko Suzuki, Suginami (JP); Toshio Sato, Yokohama (JP); Yusuke Takahashi, Tama (JP); Hiroshi Sakai, Yokohama (JP); Hideki Ueno, Urayasu (JP)

(73) Assignees: Kabushiki Kaisha Toshiba, Minato-ku (JP); Toshiba Infrastructure Systems & Solutions Corporation, Kawasaki (JP)

(*) Notice: Subject to any disclaimer, the term of this patent is extended or adjusted under 35 U.S.C. 154(b) by 172 days.

(21) Appl. No.: 16/163,680

(22) Filed: Oct. 18, 2018

(65) Prior Publication Data
US 2019/0130597 A1 May 2, 2019

(30) Foreign Application Priority Data
Oct. 27, 2017 (JP) .............................. JP2017-207732

(51) Int. Cl.
*G01C 21/36* (2006.01)
*G06K 9/00* (2022.01)
(Continued)

(52) U.S. Cl.
CPC ................ *G06T 7/70* (2017.01); *B60K 35/00* (2013.01); *G01C 21/3602* (2013.01);
(Continued)

(58) Field of Classification Search
CPC ......... G06T 17/05; G06T 19/006; G06T 7/74; G06T 7/73; G06T 7/246;
(Continued)

(56) References Cited

U.S. PATENT DOCUMENTS 6,339,746 B1 * 1/2002 Sugiyama .......... G01C 21/3644
340/323 R
9,047,668 B2    6/2015 Haas et al.
(Continued)

FOREIGN PATENT DOCUMENTS

AU    2018200870 A1    9/2018
JP    2005-265494       9/2005
(Continued)

OTHER PUBLICATIONS

Virtual camera system [webpage], captured Jan. 1, 2016 [retrieved Mar. 21, 2021], 7 pages. Retrieved: https://web.archive.org/web/20160101132329/https://en.wikipedia.org/wiki/Virtual_camera_system (Year: 2016).*

(Continued)

*Primary Examiner* — Matthew C Bella
*Assistant Examiner* — Dennis Rosario
(74) *Attorney, Agent, or Firm* — Oblon, McClelland, Maier & Neustadt, L.L.P.

(57) ABSTRACT

Generally, an information processing device according to one embodiment includes storage, a receiver, a detector, an extractor, and a position specifier. The storage stores therein, imaging positional information indicating, identification information on a landmark set, and registration landmark information, in association with one another. The receiver receives a captured image for position specification from an onboard device. The extractor extracts imaging landmark information serving as information on a detected landmark from the captured image for position specification. The (Continued)

position specifier specifies the position indicated by the imaging positional information associated with the identification information on the landmark set including the registration landmark information similar to the imaging landmark information as the position of a vehicle at time when the captured image for position specification is taken.

9 Claims, 15 Drawing Sheets

(51) Int. Cl.
*G06T 7/70* (2017.01)
*G06T 7/30* (2017.01)
*B60K 35/00* (2006.01)
*G06T 7/73* (2017.01)

(52) U.S. Cl.
CPC ..... *G01C 21/3638* (2013.01); *G01C 21/3644* (2013.01); *G06K 9/00637* (2013.01); *G06K 9/00791* (2013.01); *G06T 7/30* (2017.01); *G06T 7/73* (2017.01); *B60K 2370/21* (2019.05); *G06T 2207/10024* (2013.01); *G06T 2207/30204* (2013.01); *G06T 2207/30252* (2013.01)

(58) Field of Classification Search
CPC . G06T 2207/30252; G06F 16/29; G06K 9/46; G06K 9/468; G06K 9/00476; G06K 9/00791; G06K 9/00818; G06K 9/00664; G06K 9/00798; G06K 9/52; G06K 9/00825; G06K 9/00805; G06K 9/00637; G06K 9/00704; G05D 2201/0213; G05D 2201/02; G05D 2201/0207; B60W 2420/42; G01C 21/3602; G01C 21/3644; G01C 21/3635; G01C 21/3638
See application file for complete search history.

(56) References Cited

U.S. PATENT DOCUMENTS

| | | | | |
|---|---|---|---|---|
| 2004/0167667 | A1* | 8/2004 | Goncalves | G01C 21/12 700/245 |
| 2009/0312871 | A1* | 12/2009 | Lee | G05D 1/0272 700/259 |
| 2010/0060739 | A1* | 3/2010 | Salazar | B64D 11/0624 348/148 |
| 2014/0072173 | A1* | 3/2014 | Haas | G06T 7/74 382/103 |
| 2014/0376777 | A1 | 12/2014 | Churchill et al. | |
| 2016/0140718 | A1 | 5/2016 | Ishida | |
| 2016/0291154 | A1* | 10/2016 | Nehmadi | G01C 21/3602 |
| 2016/0305794 | A1* | 10/2016 | Horita | G06K 9/00825 |
| 2017/0008521 | A1* | 1/2017 | Braunstein | G01C 21/3407 |
| 2017/0098128 | A1 | 4/2017 | Churchill et al. | |
| 2017/0308551 | A1 | 10/2017 | Nomura | |
| 2019/0145775 | A1* | 5/2019 | Cui | G06F 16/29 701/446 |
| 2020/0300637 | A1* | 9/2020 | Chiu | G05D 1/0253 |

FOREIGN PATENT DOCUMENTS

| | | |
|---|---|---|
| JP | 2009-250718 | 10/2009 |
| JP | 4897542 | 3/2012 |
| JP | 2012-99010 A | 5/2012 |
| JP | 5421939 B2 * | 2/2014 |
| JP | 2015-508163 | 3/2015 |
| JP | 2016-99172 | 5/2016 |
| JP | 5966747 | 8/2016 |
| JP | 2018-147319 | 9/2018 |

OTHER PUBLICATIONS

U.S. Appl. No. 62/160,988 corresponding to Nehmadi et al. US 2016/0291154 A1, May 13, 2015, 57 pages. (Year: 2015).*
Machine translation of JP-5421939-B2, retrieved Aug. 11, 2021, 8 pages. Retrieved: https://patents.google.com/patent/JP5421939B2/en?oq=jp5421939 (Year: 2021).*
Australian Office Action dated Jun. 28, 2019 in Australian Patent Application No. 2018253534, 5 pages.

* cited by examiner

FIG.6

| LANDMARK SET NUMBER | IMAGING POSITIONAL INFORMATION | LANDMARK 1 ||||| LANDMARK 2 ||||| ... | LANDMARK n ||||
|---|---|---|---|---|---|---|---|---|---|---|---|---|---|---|---|---|
| | | TYPE | SHAPE | COLOR | COORDINATES ||| TYPE | SHAPE | COLOR | COORDINATES || | TYPE | SHAPE | COLOR | COORDINATES |
| 1 | LATITUDE: a1, LONGITUDE: b1 | SIGN | CIRCLE | RED | x1, y1 TO x2, y2 ||| BUILDING | RECTANGLE | GRAY | x3, y3 TO x4, y4 || | | | | |
| 2 | LATITUDE: a2, LONGITUDE: b2 | BUILDING | RECTANGLE | GRAY | x5, y5 TO x6, y6 ||| BUILDING | RECTANGLE | RED | x7, y7 TO x8, y8 || | | | | |
| 3 | LATITUDE: a3, LONGITUDE: b3 | SIGNBOARD | RECTANGLE | BLUE | x9, y9 TO x10, y10 ||| BUILDING | RECTANGLE | GRAY | x11, y11 TO x12, y12 || | | | | |
| ... | | | | | | | | | | | | | | | | |
| n | LATITUDE: an, LONGITUDE: bn | | | | | | | | | | | | | | | |

201

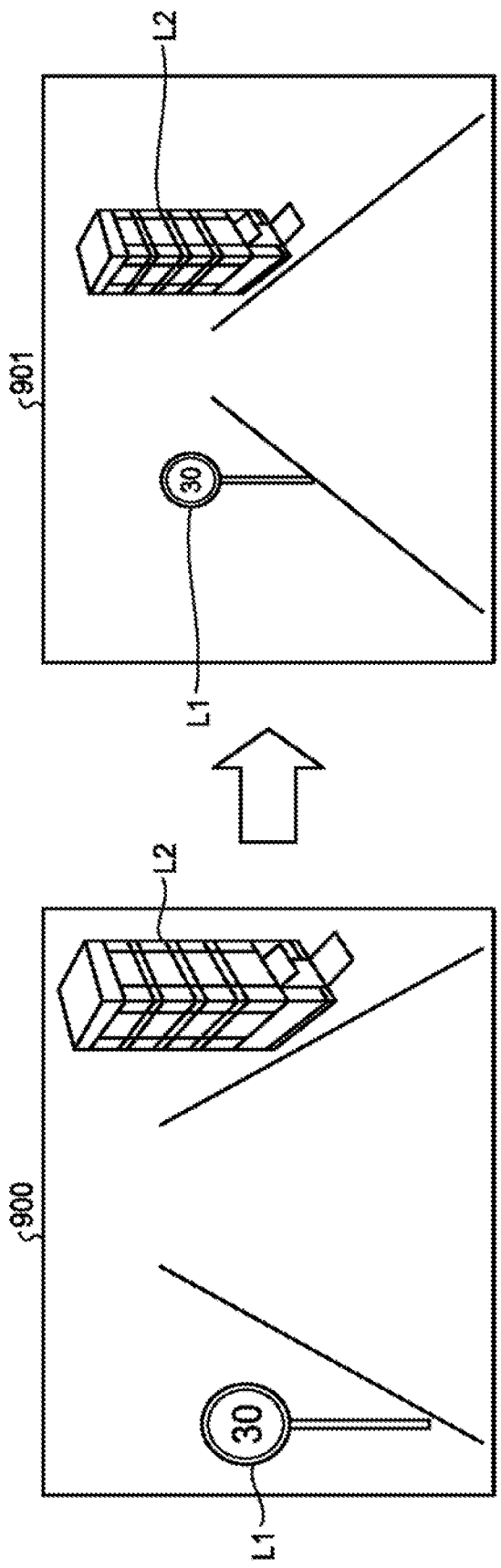

| CONVERSION ANGLE | IMAGING ANGLE CONVERSION PARAMETER |
|---|---|
| +1 DEGREE | p1 |
| +2 DEGREE | p2 |
| ... | ... |

| LAND-MARK SET NUMBER | IMAGING POSITIONAL INFORMATION | INFORMATION FOR DIRECTION CONVERSION ||||||| LANDMARK 1 |||| LANDMARK 2 |||| ... | LANDMARK n ||||
|---|---|---|---|---|---|---|---|---|---|---|---|---|---|---|---|---|---|---|---|---|---|
| | | REFERENCE DIRECTION | POINT-OF-VIEW NUMBER | DIRECTION | DIRECTION CONVERSION PARAMETER 1 | POINT-OF-VIEW NUMBER | DIRECTION | DIRECTION CONVERSION PARAMETER 2 | TYPE | SHAPE | COLOR | COORDINATES | TYPE | SHAPE | COLOR | COORDINATES | | TYPE | SHAPE | COLOR | COORDINATES |
| 1 | LATITUDE: a1, LONGITUDE: b1 | NORTH-WEST | 1 | NORTH-NORTH-WEST | p11 | 2 | WEST-NORTH-WEST | p12 | SIGN | CIRCLE | RED | x1,y1 TO x2,y2 | BUILDING | RECTANGLE | GRAY | x3,y3 TO x4,y4 | | | | | |
| | | | | | | | | | BUILDING | RECTANGLE | GRAY | x5,y5 TO x6,y6 | BUILDING | RECTANGLE | RED | x7,y7 TO x8,y8 | | | | | |
| ⋮ | ⋮ | ⋮ | ⋮ | ⋮ | | ⋮ | ⋮ | | | | | | | | | | | | | | |
| n | LATITUDE: an, LONGITUDE: bn | ⋮ | 1 | ⋮ | | 2 | ⋮ | | | | | | | | | | | | | | |

1201

INFORMATION PROCESSING DEVICE AND INFORMATION PROCESSING SYSTEM

CROSS-REFERENCE TO RELATED APPLICATIONS

This application is based upon and claims the benefit of priority from Japanese Patent Application No. 2017-207732, filed Oct. 27, 2017, the entire contents of which are incorporated herein by reference.

FIELD

Embodiments described herein relate generally to an information processing device and an information processing system.

BACKGROUND

Conventionally known are techniques of estimating the state of congestion on roads from captured images obtained by photographing the surroundings by imaging devices provided to trams and probe vehicles (hereinafter, referred to as vehicles), for example. To specify the position of vehicle at the time when a captured image is taken, positional information acquired from GPS signals is used, for example. There have been developed techniques for specifying the position of a vehicle with higher accuracy, including techniques of using not only the positional information acquired from GPS signals but also information on images of landmarks included in the captured images.

Landmarks, however, may possibly be vanished because they are structures or the like. In this case, it may possibly be difficult for the conventional techniques to specify the position of a vehicle with high accuracy.

BRIEF DESCRIPTION OF THE DRAWINGS

FIG. 6 is a diagram of an exemplary data configuration of a landmark database in the first embodiment;

FIG. 7 is a diagram of an example of a captured image for position specification and a captured image for registration in the first embodiment;

FIG. 15 is a diagram of an exemplary data configuration of the landmark database in the third embodiment;

DETAILED DESCRIPTION

In general, according to one embodiment, an information processing device according to one embodiment includes storage, a receiver, a detector, an extractor, and a position specifier. The storage stores therein, imaging positional information indicating the position at time when a captured image for registration is taken, identification information on a landmark set serving as a combination of a plurality of landmarks displayed in the captured image for registration, and registration landmark information, in association with one another. The receiver receives a captured image for position specification from an onboard device. The extractor extracts imaging landmark information serving as information on a detected landmark from the captured image for position specification. The position specifier specifies the position indicated by the imaging positional information associated with the identification information on the landmark set including the registration landmark information similar to the imaging landmark information as the position of a vehicle at time when the captured image for position specification is taken.

First Embodiment

The present embodiment describes an example where an information processing system according to the present embodiment is applied to a tram that runs on a dedicated lane laid on part of a road. The tram is an example of a vehicle according to the present embodiment. The information processing system according to the present embodiment uses captured images taken by an imaging device of the tram. The information processing system thus specifies the position of the tram with accuracy higher than that of positional information based on GPS signals received by an onboard device mounted on the tram.

Figure 1:
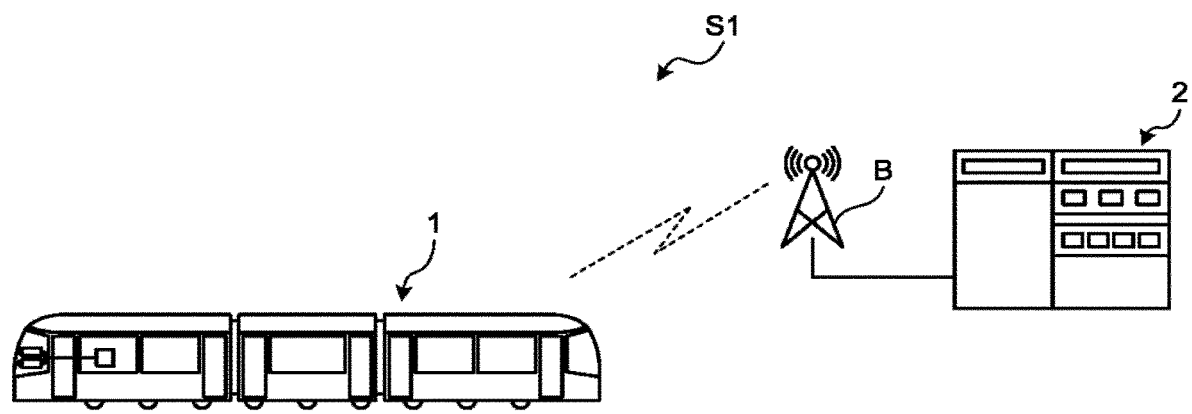
FIG. 1 is a diagram of an exemplary entire configuration of an information processing system according to a first embodiment.

FIG. 1 is a diagram of an exemplary entire configuration of an information processing system S1 according to the present embodiment. As illustrated in FIG. 1, the information processing system 1 according to the present embodiment includes a tram 1 and an information processing device 2. The tram 1 runs on a dedicated lane (illustrated in FIG. 4). The information processing device 2 is installed in an operation control center that controls the operation of the tram 1. The tram 1 and the information processing device 2 can perform wireless communications via a wireless base station B. The information processing device 2 is a server that controls the operation of the tram 1, for example.

Figure 2:
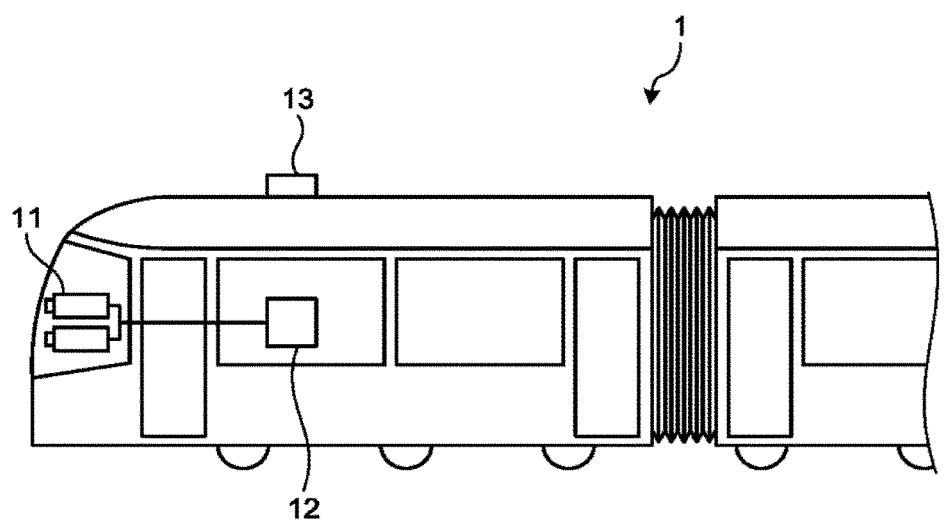
FIG. 2 is a diagram of an exemplary configuration of tram in the first embodiment.

FIG. 2 is a diagram of an exemplary configuration of the tram 1 according to the present embodiment. As illustrated in FIG. 2, the tram 1 includes an imaging device 11, an onboard device 12, and a communication device 13.

The imaging device 11 is a wide-angle camera that can photograph the dedicated lane or the surroundings of the dedicated lane, for example. The imaging device 11, for example, photographs an ordinary lane on which ordinary vehicles run in the surroundings of the dedicated lane and objects in the surroundings of a road, such as signs, buildings (structures), and trees.

A landmark according to the present embodiment denotes an object that does not move and has a distinctive shape, color, pattern (including characters), and other elements out of the objects that can be photographed by the imaging device 11 of the tram 1 that runs on the dedicated lane. Having a distinctive shape, color, pattern (including characters) and other elements means that the landmark can be distinguished from the scenery of the surroundings clearly enough to extract the landmark in image processing. Examples of the conditions of the landmark may include, but are not limited to, having a circular or rectangular shape, having a color of red, etc. The landmark does not necessarily indicate the whole one structure or the like. A main part of a certain building and a monument placed on the roof of the building may serve as different landmarks, for example. In this case, one building has two landmarks.

The communication device 13 can perform communications with an external device, such as the information processing device 2.

The onboard device 12 acquires captured images taken by the imaging device 11 and transmits them to the information processing device 2 via the communication device 13.

Figure 3:
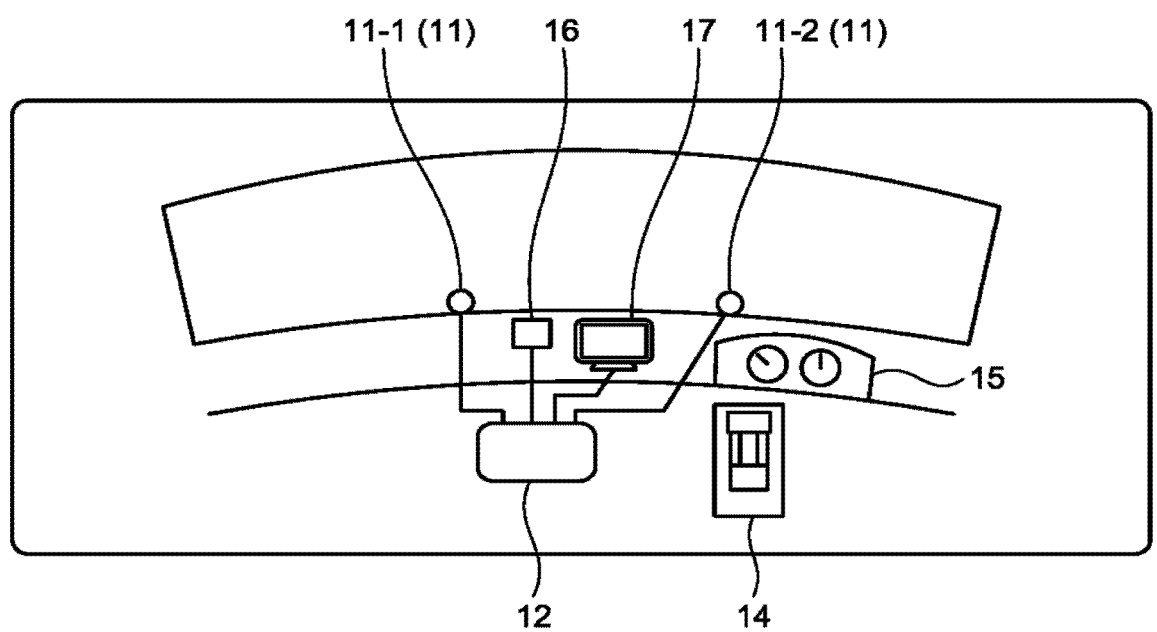
FIG. 3 is a diagram of an exemplary configuration of a cockpit of the tram in the first embodiment.

FIG. 3 is a diagram of an exemplary configuration of a cockpit of the tram 1 according to the present embodiment. As illustrated in FIG. 3, the cockpit (driving seat) of the tram 1 includes a master controller 14, a meter 15, the imaging device 11, a GPS receiver 16, and a display device 17.

The master controller 14 is a device that remotely controls the speed of the tram 1. The meter 15 displays the speed of the tram 1 and other data.

As described above, the imaging device 11 is provided so as to be capable of photographing the dedicated lane and the surroundings of the dedicated lane. The imaging device 11 according to the present embodiment is stereo camera 11-1 and 11-2 separated from each other in a lateral direction with respect to the driving seat of the tram 1. The position and the number of the imaging device 11 illustrated in FIG. 3 are given by way of example only, and the present embodiment is not limited thereto. The imaging device 11 is not limited to a stereo camera and may be a monocular camera, for example.

A captured image taken by the imaging device 11 provided to the tram 1 used for operation is referred to as a captured image for position specification because it is used to specify the position of the tram 1. A captured image taken by the imaging device 11 mounted on the tram 1 that collects information for registration, which will be described later, is referred to as a captured image for registration. The captured image taken by the imaging device 11 provided to the tram 1 illustrated in FIGS. 1 to 4 is the captured image for position specification. The captured image for registration and the captured image for position specification will be described later in detail.

The display device 17 can display various types of information, such as the captured image for position specification taken by the imaging device 11.

The global positioning system (GPS) receiver 16 acquires the position of the tram 1 based on GPO signals received from GPS satellites.

Figure 4:
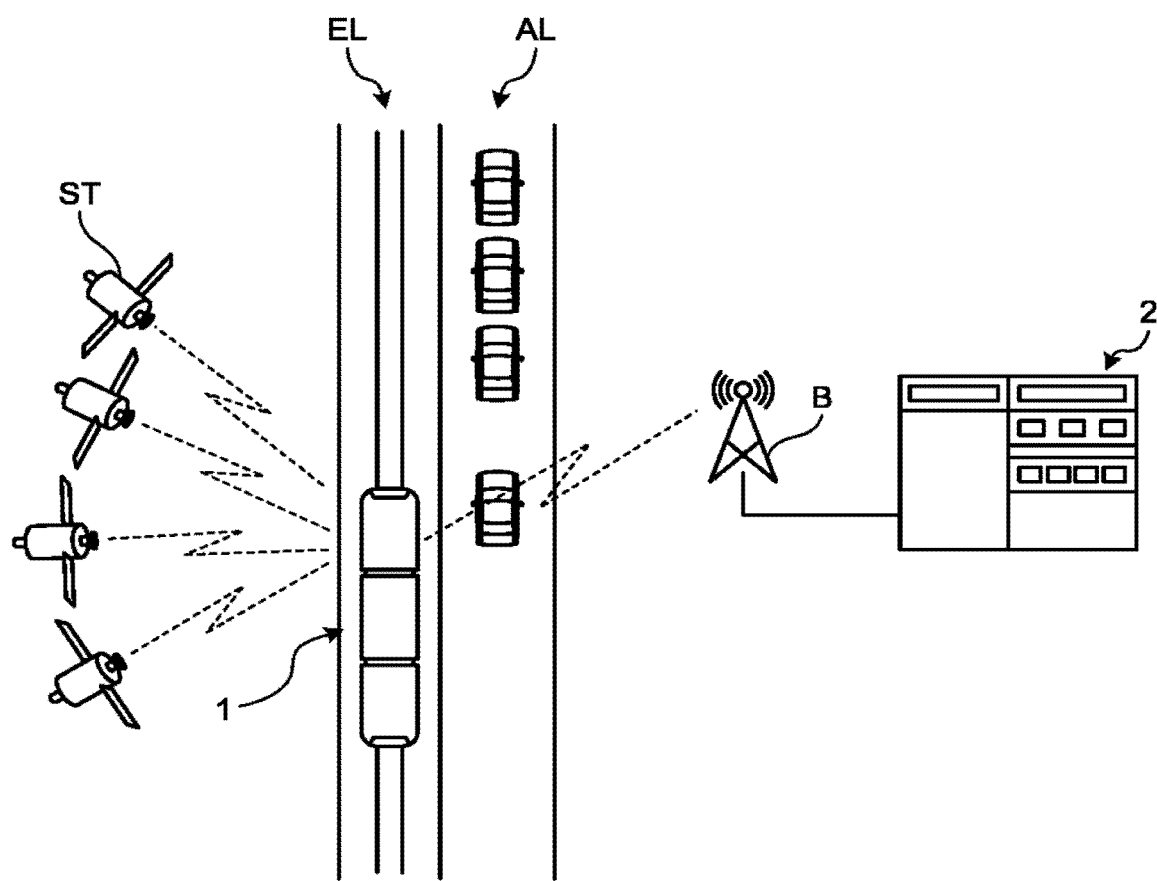
FIG. 4 is a diagram for explaining an example of acquiring the position of the tram based on GPS signals in the first embodiment.

FIG. 4 is a diagram for explaining an example of acquiring the position of the tram 1 based on GPS signals according to the present embodiment. As illustrated in FIG. 4, the GPS receiver 16 receives GPS signals from GPS satellites ST (illustrated in FIG. 4) via a GPS antenna and measures the position of the tram 1 based on the received GPS signals.

As illustrated in FIG. 4, the imaging device 11 can photograph not only a dedicated lane FL on which the tram 1 runs but also an ordinary lane AL extending side by side with the dedicated lane EL.

The onboard device 12 transmits information indicating the position of the tram 1 measured based on the GPS signals, the captured image taken by the imaging device 11, and imaging time of the captured image to the information processing device 2 via the wireless base station B. The information indicating the position of the tram 1 is the latitude and the longitude, for example. In the present embodiment, the information indicating the position of the tram 1 measured based on the GPS signals is referred to as GPS positional information.

The onboard device 12 and the information processing device 2 according to the present embodiment include a CPU, a storage device, such as a read only memory (ROM) and a random access memory (RAM), and an external storage device, such as a hard disk drive (HDD) and a solid state drive (SSD). The onboard device 12 and the information processing device 2 have a hardware configuration using an ordinary computer.

Figure 5:
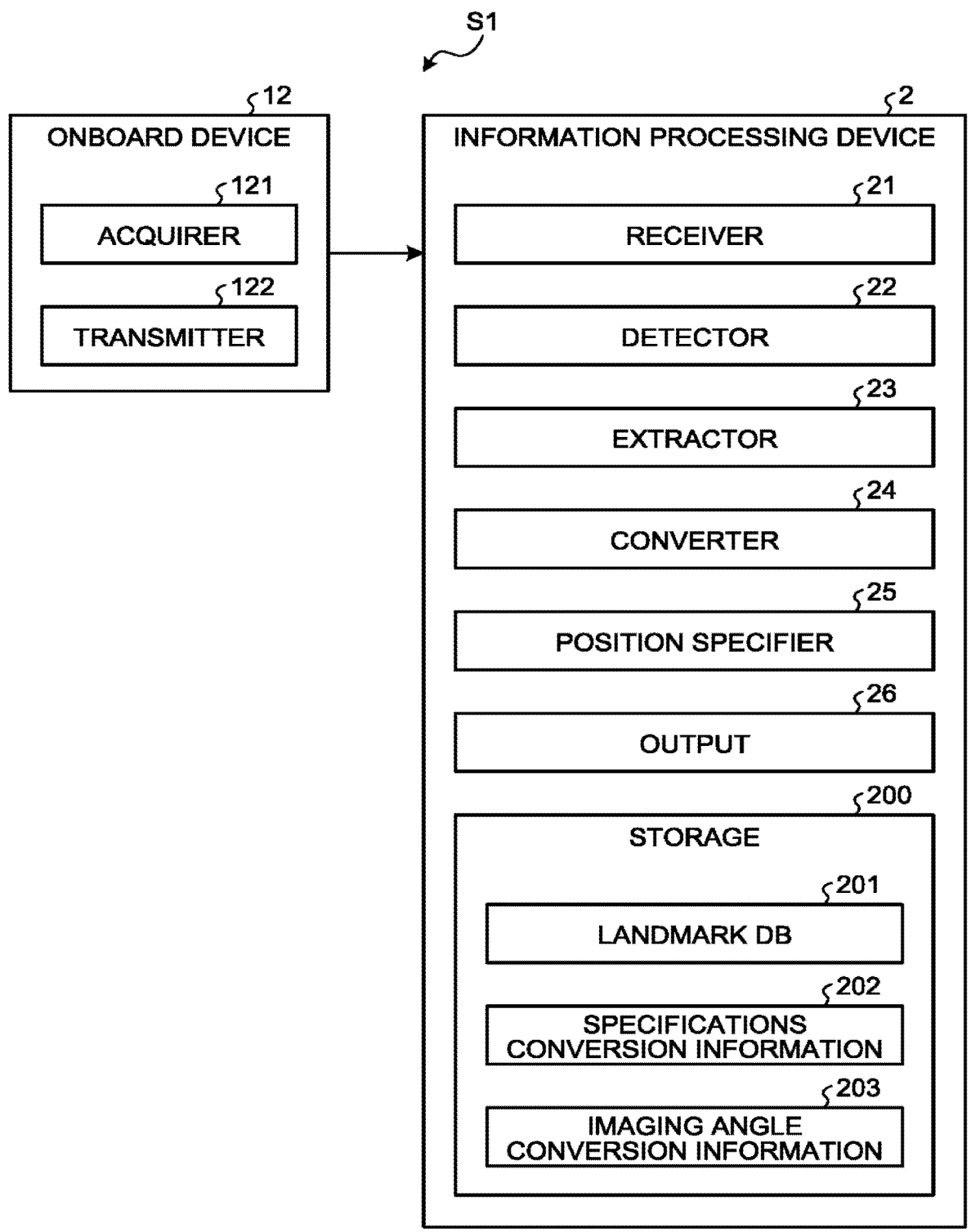
FIG. 5 is a diagram of an exemplary functional configuration of an onboard device and an information processing device in the first embodiment.

FIG. 5 is a diagram of an exemplary functional configuration of the onboard device 12 and the information processing device 2 according to the present embodiment. The onboard device 12 of the information processing system according to the present embodiment includes an acquirer 121 and a transmitter 122.

The acquirer 121 acquires the captured image for position specification and imaging time of the captured image for position specification from the imaging device 11. The acquirer 121 also acquires the GPS positional information on the tram 1 measured by the GPS receiver 16 at the imaging time of the captured image for position specification from the GPS receiver 16.

The transmitter 122 transmits, to the information processing device 2, the captured image for position specification acquired by the acquirer 121, the imaging time of the captured image for position specification, and the GPS positional information at the imaging time of the captured image for position specification in a manner associated with one another.

The information processing device 2 includes a receiver 21, a detector 22, an extractor 23, a converter 24, a position specifier 25, an output 26, and a storage 200.

The storage 200 stores therein a landmark database (DB) 201, specifications conversion information 202, and imaging angle conversion information 203. The storage 200 is a storage device, such as an HDD.

The landmark DB 201 registers in advance information on landmarks present in the surroundings of dedicated lane EL on which the tram 1 runs. To register the information on landmarks, the landmark DB 201 registers information on landmarks collected using the tram 1 that collects the information for registration, for example.

The tram 1 that collects the information to be registered in the landmark DB 201 may be the tram 1 used for usual operation or the tram 1 used only for collecting the information to be registered. Alternatively, an administrator and other persons may place imaging devices and GPS receivers on the dedicated lane to collect the information to be registered in the landmark DB 201 without using the tram 1.

FIG. 6 is a diagram of an exemplary data configuration of the landmark DB 201 according to the present embodiment. As illustrated in FIG. 6, the landmark DB 201 has landmark set numbers, imaging positional information, and registration landmark information relating to landmarks 1 to n.

The imaging positional information is the latitude and the longitude indicating the position of the tram 1 obtained when the captured image for registration is taken in advance by the imaging device 11 mounted on the tram 1 that collects the information for registration. The imaging positional information indicates the position of the tram 1 with accuracy higher than that of the GPS positional information measured using the GPS receiver 16 in usual operation. The tram 1 used only for collecting the information for registration, for example, may include the GPS receiver 16 that is more accurate than the one mounted on the tram 1 used for usual operation to measure the GPS positional information with high accuracy. Alternatively, the landmark DB 201 may register, as the imaging positional information, the latitude and the longitude calculated statistically with higher accuracy from the results of measuring the GPS positional information a plurality of times on the same course of the dedicated lane EL. The imaging positional information according to the present embodiment indicates the position of the tram 1 obtained when the captured image for registration is taken. The imaging positional information, however, is not necessarily actually derived from the GPS positional information measured by the GPS receiver 16 or the like mounted on the tram 1. The imaging positional information may be derived by measuring, by a surveyor and other persons, the position where the tram 1 is assumed to be present when the captured image for registration is taken by the imaging device 11 mounted on the tram 1, for example.

The landmark set number is identification information for identifying a landmark set. The landmark set is a combination of a plurality of landmarks displayed in the captured image for registration taken at a certain position. A record in the landmark DB 201 illustrated in FIG. 6 is identified by the imaging positional information or the landmark set number.

The registration landmark information indicates the characteristics of landmarks included in one landmark set. The registration landmark information includes any one of the shape, the color, and the pattern (including characters) of the landmark displayed in the captured image for registration and the coordinates indicating the range in which the landmark is displayed on the captured image for registration. As illustrated in FIG. 6, the registration landmark information according to the present embodiment includes the type, the shape, the color, and the coordinates of the landmark displayed in the captured image for registration.

The type indicates what kind of object the landmark is. Examples of the type of the landmark include, but are not limited to, a sign, a building (structure), a signboard, a tree, etc. The type is referred to by the administrator and other persons to register and update the landmark DB 201, for example.

The shape indicates the shape of the landmark displayed in the captured image for registration and is a circle or a rectangle, for example. The landmark DB 201 may register information indicating the shape of the landmark in the captured image for registration in greater detail.

The coordinates indicate the range in which the landmark is displayed on the captured image for registration. More specifically, in the captured image for registration having certain resolution, the coordinates indicate which range the image of the landmark is positioned on the captured image for registration with an x-coordinate (horizontal) and a y-coordinate (vertical).

In the captured image for registration taken at a position of "latitude: a1, longitude: b1" illustrated in FIG. 6, for example, a "sign" having a color of "red" and a shape of "circle" is displayed in a range of coordinates of "x1,y1 to x2,y2". The sign is defined as a landmark 1 at the imaging position. In the same captured image for registration, a "building" having a color of "gray" and a shape of "rectangle" is displayed in a range of coordinates of "x3,y3 to x4,y4". The building is defined as a landmark 2. The combination (landmark set) of the sign and the building displayed in the captured image for registration taken at the position of "latitude: a1, longitude: b1" is identified by a landmark set number "1". The registration landmark information is registered for each landmark set number. As a result, information with the same "landmark 1" indicates different objects in different landmark set numbers.

The data configuration of the landmark DB 201 illustrated in FIG. 6 is given by way of example only, and the present embodiment is not limited thereto. The landmark DB 201, for example, may further have the number of landmarks indicating the number of landmarks included in each of the landmark sets. The number of landmarks of the landmark set with the landmark set number "1" is "2" because the landmark set includes two landmarks.

The shape and the color of the landmark are given by way of example of the characteristics of the landmark displayed in the captured image for registration, and other characteristics may be registered in the landmark DB 201. The landmark DB 201 may include any one of the shape, the color, and the pattern (including characters) of the landmark. The landmark DB 201 does not necessarily have the type.

Referring back to FIG. 5, the specifications conversion information 202 is used to convert information on the landmark (hereinafter, referred to as imaging landmark information) extracted by the extractor 23, which will be described later, from the captured image for position specification taken by the imaging device 11 provided to the tram 1 used for operation into the imaging landmark information obtained by the imaging device 11 provided to the tram 1 that collects the information for registration.

More specifically, the imaging device 11 provided to the tram 1 used for operation may possibly have specifications different from those of the imaging device 11 provided to the tram 1 that collects the information for registration. To address this, the specifications of the imaging device 11 provided to the tram 1 that collects the information for registration are defined as standard specifications. The converter 24, which will be described later, converts the imaging landmark information according to the standard specifications.

Examples of the specifications of the imaging device 11 include, but are not limited to, the focal length of a lens, the size of imaging elements, pixels, etc. If the imaging devices 11 have different focal lengths of the lens, for example, they have different angles of view. This causes variations in the position of the image range in which the landmark is displayed in the captured images.

FIG. 7 is a diagram of an example of a captured image for position specification 900 and a captured image for registration 901 according to the present embodiment. If the imaging device 11 provided to the tram 1 used for operation has specifications different from those of the imaging device 11 provided to the tram 1 that collects the information for registration, landmarks L1 and L2 are displayed at different positions in the captured images as illustrated in FIG. 7. The landmarks L1 and L2 are hereinafter referred to as landmarks L when they are not particularly distinguished from each other.

The specifications conversion information 202 according to the present embodiment is conversion parameter information for converting the coordinates indicating the image range in which the landmark is displayed in the captured image for position specification 900 into the coordinates obtained by imaging according to the standard specifications. This is given by way of example only, and the contents of the specifications conversion information 202 are not limited thereto. The specifications conversion information 202 may be used to convert information other than the coordinates.

The specifications conversion information 202 according to the present embodiment is conversion parameter information for converting the imaging landmark information. Alternatively, the specifications conversion information 202 may be conversion parameter information for converting the captured image for position specification 900 into the captured image for position specification 900 taken by the imaging device 11 provided to the tram 1 that collects the information for registration.

Referring back to FIG. 5, the imaging angle conversion information 203 is used to convert the imaging landmark information into the imaging landmark information obtained when the imaging angle of the imaging device 11 that takes the captured image for position specification 900 is different. The "imaging angle of the imaging device 11 that takes the captured image for position specification 900" is also referred to as the "imaging angle of the captured image for position specification 900".

The installation angle or the position of the imaging device 11 provided to the tram 1 used for operation may possibly be different from that of the imaging device 11 provided to the tram 1 that collects the information for registration. In this case, the imaging angles of the captured image for registration 901 and the captured image for position specification 900 taken at the same position are different from each other, thereby causing variations in the position of the image range in which the landmark is displayed in the captured images. In this case, the imaging landmark information extracted from the captured image for position specification 900 taken at the same position as the position where the captured image for registration 901 is taken may possibly disagree with the registration landmark information. Converting the imaging landmark information can cause it to agree with the registration landmark information.

The present embodiment, for example, does not find out in advance how large the difference between the imaging angle of the captured image for position specification 900 and the imaging angle (hereinafter, referred to as a standard imaging angle) of the imaging device 11 provided to the tram 1 that collects the information for registration is. In this case, the converter 24, which will be described later, converts the imaging landmark information into the imaging landmark information obtained by converting the imaging angle of the captured image for position specification 900 at a positive or negative angle by each several degree.

Figures 8, 9:
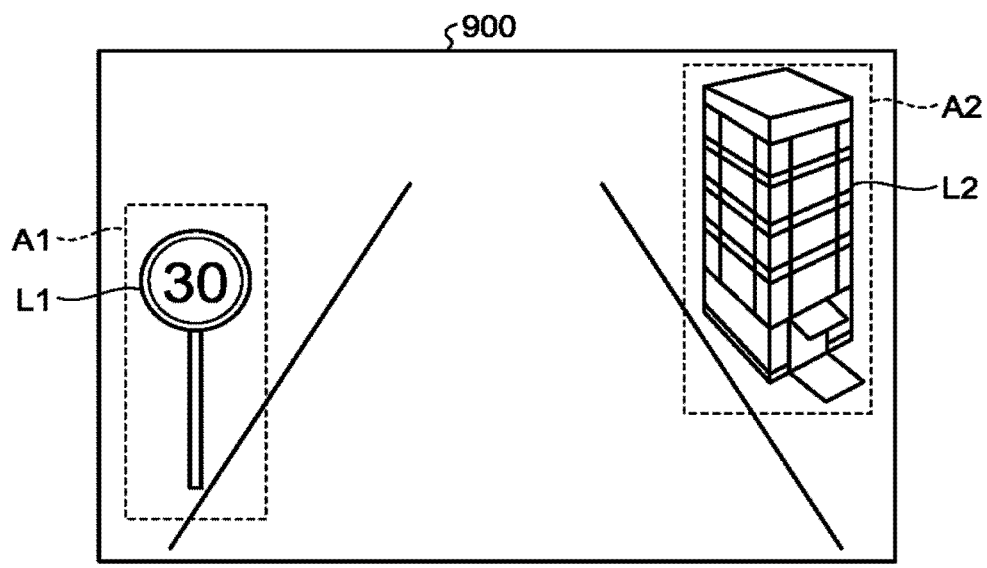
FIG. 8 is a diagram of an example of imaging angle conversion information in the first embodiment.
FIG. 9 is a diagram of an example of the captured image for position specification in the first embodiment.

FIG. 8 is a diagram of an example of the imaging angle conversion information 203 according to the present embodiment. As illustrated in FIG. 8, the imaging angle conversion information 203 has a conversion angle and an imaging angle conversion parameter associated with each other. The conversion angle is the difference between the imaging angle of the captured image for position specification 900 and the imaging angle in the imaging landmark information resulting from conversion. The imaging angle conversion parameter is parameter formation for converting the coordinates indicating the image range in which the landmark is displayed in the imaging landmark information by the conversion angle associated therewith.

For example, "p1" is the imaging angle conversion parameter for converting the imaging landmark information into a state of being extracted from the captured image taken at the imaging angle changed by "+1 degree" from the imaging angle of the captured image for position specification 900. The imaging angle conversion parameter according to the present embodiment is used to convert the coordinates in the imaging landmark information.

The contents of the imaging angle conversion information 203 illustrated in FIG. 8 are given by way of example only, and the present embodiment is not limited thereto. The imaging angle conversion information 203 may be used to convert information other than the coordinates.

Referring back to FIG. 5, the receiver 21 receives, from the onboard device 12 mounted on the tram 1 used for operation, the captured image for position specification 900, the imaging time of the captured image for position specification 900, and the GPS positional information at the imaging time of the captured image for position specification 900.

The detector 22 detects the landmark L displayed in the captured image for position specification 900. To detect the landmark L, the detector 22 according to the present embodiment sets a region (search region) for performing detection on the captured image for position specification 900. Subsequently, the detector 22 detects an image satisfying the conditions of the landmark L included in the search region as the landmark L displayed in the captured image for position specification 900.

More specifically, the detector 22 searches the landmark DB 201 for the imaging positional information included in a certain range from the position indicated by the GPS positional information received by the receiver 21. In the following description, a search result denotes the imaging positional information included in the certain range from the position indicated by the GPS positional information received by the receiver 21 and information (the landmark set number, the imaging positional information, and the registration landmark information) associated with the imaging positional information. While the certain range is within a radius of 10 m or smaller from the position indicated by the GPS positional information, for example, it is rot limited thereto.

The detector 22 sets the search region for the landmark L based on the coordinates of the registration landmark information included in the search result on the captured image for position specification 900.

FIG. 9 is a diagram of an example of the captured image for position specification 900 according to the present embodiment. Let us assume a case where "latitude: a1, longitude: b1" is the imaging positional information included in the certain range from the position indicated by the GPS positional information out of the pieces of information registered in the landmark DB 201 illustrated in FIG. 5, for example. In this case, the information associated with the landmark set number "1" is included in the search result.

Based on the search result, the detector 22 sets the image range near t coordinates associated with the landmark set number "1", that is, the coordinates of "x1,y1 to x2,y2" and "x3,y3 to x4,y4" as the search region on the captured image for position specification 900.

Search regions A1 and A2 illustrated in FIG. 9 are the image ranges near the coordinates of the registration landmark information included in the search result. The coordinates of the image range in which the landmark is displayed may possibly be different between the captured image for position specification 900 and the captured image for registration 901. To address this, the detector 22 sets the search regions A1 and A2 wider than the image ranges indicated by the coordinates of the registration landmark information. If the search result includes a plurality of landmark set numbers, the detector 22 sets the search regions based on the registration landmark information associated with the landmark set numbers.

The detector 22 performs detecting the edge and the color on the search regions A1 and A2 by a publicly known method, thereby detecting the shape and the color of the objects displayed in the search regions A1 and A2. The detector 22 thus detects the images satisfying the conditions of the landmark L as the landmarks L1 and L2 displayed in the captured image for position specification 900. The detector 22 detects the images having a circular or rectangular shape and the colors of the circular or rectangular image from the search regions A1 and A2.

As described above, the detector 22 sets the search regions A1 and A2. This mechanism requires a lower calculation cost and a lower processing load than in a case where detection is performed on the whole captured image for position specification 900. The method for detecting the landmarks displayed in the captured image for position specification 900 is not limited to the method described above.

The search result obtained by the detector 22 searching the landmark DB 201 based on the GPS positional information is also used by the position specifier 25. The functions of the position specifier 25 will be described later in greater detail.

Referring back to FIG. 5, the extractor 23 extracts the imaging landmark information indicating the characteristics of the landmark L detected by the detector 22.

The imaging landmark information includes any one of the shape, the color, and the pattern (including characters) of the landmark L displayed in the captured image for position specification 900 and the coordinates indicating the range in which the landmark L is displayed or the captured image for position specification 900. The imaging landmark information according to the present embodiment is the shape and the color of the landmark L displayed in the captured image for position specification 900 and the coordinates indicating the range in which the landmark L is displayed on the captured image for position specification 960. The imaging landmark information simply needs to be capable of determining the similarity to the registration landmark information and is not limited to the information described above. The imaging landmark information may include any one of the shape, the color, and the pattern (including characters) of the landmark L, for example.

The converter 24 converts the imaging landmark information extracted by the extractor 23 into the imaging landmark information obtained by the imaging device 11 that takes the captured image for registration 901 if the specifications of the imaging device 11 that takes the captured image for position specification 900 are different from the standard specifications. More specifically, the converter 24 converts the coordinates indicating the image range in which the landmark is displayed in the captured image for position specification 900 into the coordinates obtained by imaging according to the standard specifications using the specifications conversion information 202.

The converter 24 converts the imaging landmark information into the imaging landmark information obtained by imaging at a different imaging angle of the captured image for position specification 900. More specifically, the converter 24 converts the coordinates indicating the image range in which the landmark is displayed in the captured image for position specification 900 into the coordinates obtained by imaging at a different imaging angle using the imaging angle conversion information 203. The present embodiment does not find out in advance how large the difference between the imaging angle of the captured image for position specification 900 and the standard imaging angle is. Consequently, the converter 24 generates the imaging landmark information resulting from conversion of the imaging angle corresponding to each of the conversion angles registered in the imaging angle conversion information 203.

The position specifier 25, which will be described later, compares the imaging landmark information and the registration landmark information. If there is no landmark set having more than half of the pieces of its registration landmark information agreeing with the imaging landmark information, the converter 24 according to the present embodiment converts the imaging angle before the next comparison. The timing of converting the imaging angle is not limited to the timing described above.

The converter 24 may convert not the imaging landmark information but the captured image for position specification 900 into a state of being taken according to the standard specifications or at a different imaging angle.

The position specifier specifies the position indicated by the imaging positional information associated with the identification information on the landmark set including the registration landmark information similar to the imaging landmark information as the position of the tram 1 at the imaging time of the captured image for position specification 900.

More specifically, the position specifier 25 compares a plurality of pieces of imaging landmark information resulting from converting, by the converter 24, the coordinates into the coordinates obtained by imaging according to the standard specifications with a plurality of pieces of registration landmark information included in the search result retrieved from the landmark DB 201 based on the GPS positional information by the detector 22.

If a certain number or more of pieces of registration landmark information out of the pieces of registration landmark information associated with a certain landmark set number agree with the imaging landmark information extracted from the captured image for position specification 900, the position specifier 25 specifies the imaging positional information associated with the landmark set number as the position of the tram 1 at the imaging time of the captured image for position specification 900.

The object to be compared by the position specifier 25 is limited to the registration landmark information included in the search result retrieved based on the GPS positional information. This is because reducing the number of pieces of registration landmark information to be compared reduces the processing load and the processing time. The present embodiment aims to detect the position of the tram 1 with accuracy higher than that of the GPS positional information received by the receiver 21. With this aim, the position specifier 25 compares a plurality of pieces of registration landmark information stored in the landmark DE 201 with the imaging landmark information, thereby specifying the position of the tram 1. The landmark DB 201, however, stores therein the registration landmark information associated with various pieces of imaging positional information. If the position specifier 25 performs comparison on all the pieces of registration landmark information stored in the landmark DB 201, the operation load increases. To address this, the position specifier 25 according to the present embodiment limits the search region in the landmark DB 201 based on the position indicated by the GPS positional information. If the number of landmark sets registered in the landmark DB 201 is small, for example, the position specifier 25 may use all the landmark sets for comparison without limiting the search region based on the GPS positional information.

The certain number according to the present embodiment is more than half of the pieces of registration landmark information associated with the landmark set number. Let us assume a case where a certain landmark set includes five landmarks L, for example. In other words, five pieces of registration landmark information are associated with certain landmark set number in the landmark DB 201. If three pieces of registration landmark information agree with respective pieces of imaging landmark information, the position specifier 25 specifies the imaging positional information associated with the landmark set number as the position of the tram 1 at the imaging time of the captured image for position specification 900.

As described above, even if all the pieces of registration landmark information associated with the landmark set number do not agree with the imaging landmark information, the position specifier 25 specifies the imaging positional information associated with the landmark set number having more than half the pieces of its registration landmark information agreeing with the imaging landmark information as the position of the tram 1. With this mechanism, the position specifier 25 can specify the position of the tram 1 with higher accuracy if the environment of the surroundings, the imaging conditions, and other conditions change, for example. Any one of the landmarks L present at the time when the captured image for registration 901 is taken may possibly be vanished at the imaging time of the captured image for position specification 900, for example. Furthermore, any one of the landmarks L may possibly disappear in the captured image for position specification 900 because it is hidden by an obstacle, for example. To deal with such cases, the position specifier performs position specification with the condition that more than half of the pieces of registration landmark information agree with the imaging landmark information. With this condition, the position specifier 25 can specify the landmark set number and the imaging positional information based on the registration landmark information agreeing with the imaging landmark information relating to the remaining landmarks L not being vanished or not disappearing. The position specifier 25 thus can specify the position of the tram 1.

More than half is an example of the certain number according to the present embodiment. The condition for specifying the position of the tram 1 at the imaging time of the captured image for position specification 900 is not limited thereto.

If there is no landmark set having more than half of the pieces of its registration landmark information agreeing with the imaging landmark information, the position specifier 25 compares the imaging landmark information resulting from converting the imaging angle by the converter 24 with the registration landmark information again.

If there are a plurality of landmark set numbers satisfying the condition, the position specifier 25 specifies the imaging positional information associated with the landmark set number having the largest number of pieces of registration landmark information agreeing with the imaging landmark information as the position of the tram 1 at the imaging time of the captured image for position specification 900.

If the imaging landmark information and the registration landmark information are not completely the the position specifier 25 may determine that they are identical if the difference therebetween falls within a predetermined range. If the difference in the coordinates of the imaging landmark information and the registration landmark information falls within a predetermined range, for example, the position specifier 25 may determine that the imaging landmark information and the registration landmark information are identical.

The position specifier 25 may store, in the storage 200, the captured image for position specification 900, the imaging time of the captured image for position specification 900, and the specified position of the tram 1 at the imaging time of the captured image for position specification 900 in a manner associated with one another.

The output 26 outputs (transmits) the captured image for position specification 900, the imaging time of the captured image for position specification 900, and the position of the tram 1 at the imaging time of the captured image for position specification 900 specified by the position specifier 25 in a manner associated with one another to a computer or the like in a traffic control center, which is not illustrated. The output form is not limited thereto, and the output 26 may output the data described above to display (display unit) of the information processing device 2, for example.

Figure 10:
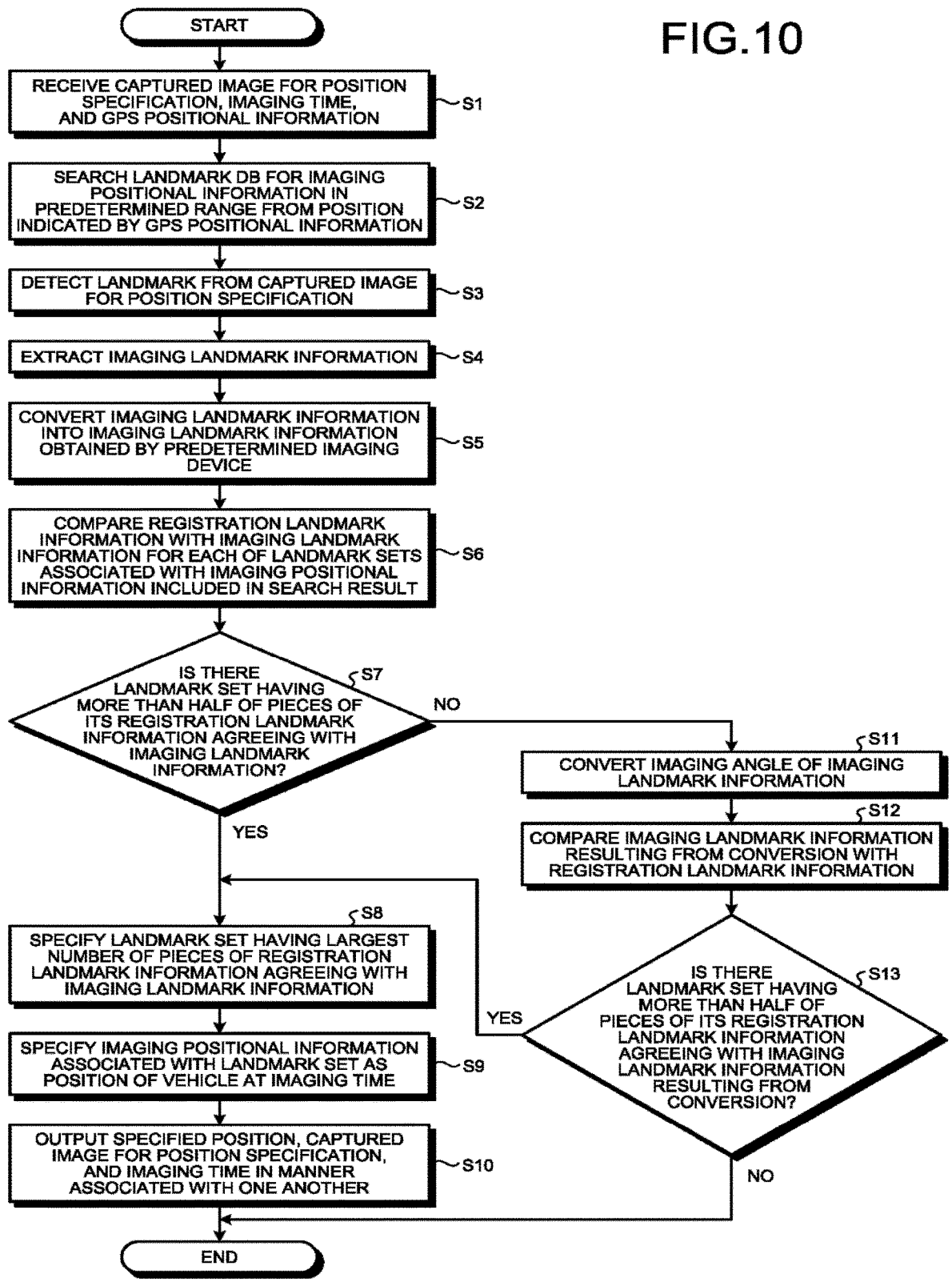
FIG. 10 is a flowchart of an exemplary process of position specification in the first embodiment.

The following describes specification of the position of the tram 1 performed by the information processing device 2 having the configuration described above. FIG. 10 is a flowchart of an exemplary process of position specification according to the present embodiment.

First, the receiver 21 receives, from the onboard device 12 mounted on the tram 1 used for operation, the captured image for position specification 900, the imaging time of the captured image for position specification 900, and the GPS positional information at the imaging time of the captured image for position specification 900 (S1).

The detector 22 searches the landmark DB 201 for the imaging positional information included in the certain range from the position indicated by the GPS positional information received by the receiver 21 (S2). The detector sets the search regions A1 and A2 for the landmarks based on the coordinates of the registration landmark information included in the search result on the captured image for position specification 900. The detector 22 detects the shape, the color, the pattern, (including characters), and other elements of the objects displayed in the search regions A1 and A2. The detector 22 thus detects the images satisfying the conditions of the landmarks as the landmarks L1 and L2 displayed in the captured image for position specification 900 (S3).

The extractor 23 extracts, from the captured image for position specification 900, the imaging landmark information on the landmarks L1 and L2 detected by the detector 22 (the shape, the color, and the pattern (including characters) of the landmarks L1 and L2 displayed in the captured image for position specification 900 and the coordinates indicating the ranges in which the landmarks L1 and L2 are displayed on the captured image for position specification 900) (S4).

In the present embodiment, the specifications of the imaging device 11 that takes the captured image for position specification 900 are different from the specification (standard specifications) of the imaging device 11 provided to the tram 1 that collects the information for registration. The converter 24 converts the imaging landmark information into the imaging landmark information obtained by the predetermined imaging device 11 (that is, the imaging device 11 having the standard specifications) using the specifications conversion information 202 (S5). More specifically, the converter 24 converts the coordinates indicating the image range in which the landmark is displayed in the captured image for position specification 900 into the coordinates obtained by imaging according to the standard specifications.

Subsequently, the position specifier 25 compares the registration landmark information with the imaging landmark information resulting from conversion, performed by the converter 24 for each of the landmark sets associated with the imaging positional information included in the search result of the search performed on the landmark DB 201 at S2 (S6).

The position specifier 25 determines whether there is a landmark set having more than half of the pieces of it registration landmark information agreeing with the imaging landmark information (S1).

If there are landmark sets having more than half of the pieces of their registration landmark information agreeing with the imaging landmark information ("Yes" at S7), the position specifier 25 specifies the landmark set having the largest number of pieces of registration landmark information agreeing with the imaging landmark information (S6).

The position specifier 25 specifies the imaging positional information associated with the landmark set specified at S8 as the position of the tram 1 at the imaging time of the captured image for position specification 900 (S9).

The output outputs the captured image for position specification 900, the imaging time of the captured image for position specification 900, and the position of the tram 1 at the imaging time of the captured image for position specification 900 specified by the position specifier 25 in a manner associated with one another to a computer or the like in the traffic control center, which is not illustrated (S10).

If there no landmark set having more than half of the pieces of its registration landmark information agreeing with the imaging landmark information ("No" at S7), the converter 24 converts the imaging angle of the imaging landmark information (S11). More specifically, the converter 24 converts the coordinates indicating the image range in which the landmark is displayed in the captured image for position specification 900 into the coordinates obtained by imaging at a different imaging angle using the imaging angle conversion information 203.

Subsequently, the position specifier 25 compares the imaging landmark information resulting from converting the imaging angle by the converter 24 with the registration landmark information for each of the landmark sets associated with the imaging positional information included in the search result of the search performed on the landmark DB 201 at S2 (312).

The position specifier 25 determines whether there is a landmark set having more than half of the pieces of its registration landmark information agreeing with the imaging landmark information resulting from conversion of the imaging angle (S13).

If there are landmark sets having more than half of the pieces of their registration landmark information agreeing with the imaging landmark information resulting from conversion of the imaging angle ("Yes" at S13), the process proceeds to S8.

If there is no landmark set having more than half of the pieces of its registration landmark information agreeing with the imaging landmark information resulting from conversion of the imaging angle ("No" at S13), the processing of the flowchart is ended.

As described above, the information processing device 2 according to the present embodiment stores therein the landmark DB 201 having the imaging positional information, the landmark set number, and a plurality of pieces of registration landmark information associated with one another. The information processing device 2 according to the present embodiment extracts the imaging landmark information from the captured image for position specification 900 taken by the imaging device 11 mounted on the tram 1. The information processing device 2 specifies the position indicated by the imaging positional information associated with the landmark set number including the registration landmark information similar to the imaging landmark information as the position of the tram 1 at the time when the captured image for position specification 900 is taken. As described above, the information processing device 2 according to the present embodiment uses the landmark set serving as a combination of a plurality of pieces of registration landmark information. Consequently, the information processing device 2 can specify the position of the trans 1 with high accuracy if part of the landmarks L are vanished or hidden by an obstacle, for example.

The information processing device 2 according to the present embodiment uses the landmark set serving as a combination of a plurality of pieces of registration landmark information. Consequently, the information processing device 2 can specify the position of the tram 1 with high accuracy by combining the positions (coordinates) of a plurality of landmarks in the captured image for registration 901 if it is difficult to specify the position with only one landmark L. The present embodiment uses a sign as the landmark L1, for example. By combining the landmark L1 with the other landmark L2, for example, the present embodiment can provide a more reliable result of specifying the position of the tram 1 than in a case where it specifies the position using only one sign.

In the information processing device 2 according to the present embodiment, the registration landmark information and the imaging landmark information each include any one of the shape, the color, the pattern, and the characters, and the coordinates of the landmark displayed in the captured image for registration 901 or the captured image for position specification 900. The information processing device 2 according to the present embodiment determines whether any one of the shape, the color, the pattern, and the characters, and the coordinates of the landmarks L included in the registration landmark information and the imaging landmark information are similar to each other. The information processing device 2 thus specifies the position of the tram 1 at the time when the captured image for position specification 900 is taken with the latitude and the longitude. Consequently, the information processing device 2 according to the present embodiment requires a shorter processing time and a lower processing load than in a method of simply comparing the captured image for registration 901 and the captured image for position specification 900.

If a certain number or more of pieces of registration landmark information out of the pieces of registration landmark information included in the landmark set agree with the imaging landmark information, the information processing device 2 according to the present embodiment specifies the position indicated by the imaging positional information associated with the identification information on the landmark set as the position of the tram 1 at the time when the captured image for position specification 900 is taken. Even if the captured image for position specification 900 is not completely identical with the captured image for registration 901 due to the imaging conditions and other conditions, the information processing device 2 according to the present embodiment can specify the imaging positional information if a plurality of landmarks L displayed in the captured images are similar to each other. Consequently, the information processing device 2 can specify the position of the tram 1 with high accuracy.

If the specifications of the imaging device 11 that takes the captured image for position specification 900 are different from those of the imaging device 11 that takes the captured image for registration 901, the information processing device 2 according to the present embodiment converts the imaging landmark information into the imaging landmark information obtained by the imaging device 11 that takes the captured image for registration 901. The information processing device 2 then compares the imaging landmark information resulting from conversion with the registration landmark information. Consequently, the information processing device 2 according to the present embodiment can specify the position of the tram 1 with high accuracy if the specifications of the imaging device 11 provided to the tram 1 used for operation are different from the standard specifications. The information processing device 2 according to the present embodiment, for example, can specify the position of the tram 1 using a camera already provided to the tram 1 as the imaging device 11.

The information processing device 2 according to the present embodiment converts the imaging landmark information into the imaging landmark information obtained by imaging at a different imaging angle of the captured image for position specification 900. Consequently, the information processing device 2 according to the present embodiment can specify the position of the tram 1 by converting the imaging landmark information if the imaging angle of the imaging device 11 provided to the tram 1 used for operation is different from the standard imaging angle. With this configuration, the information processing device 2 according to the present embodiment need not register in advance the registration landmark information corresponding to each imaging angle of the imaging devices 11 provided to the trams 1 in the landmark DB 201. Consequently, the information processing device 2 requires smaller data capacity.

The tram 1 according to the present embodiment is an example of a dedicated lane running vehicle. The information processing system may be applied to dedicated lane running vehicles other than the tram 1. Examples of the other dedicated lane running vehicles include, but are not limited to, street cars, guideway buses that run on a dedicated lane called a guideway, etc.

First Modification

While the information processing device 2 performs position specification in the first embodiment, part or all of the position specification may be performed by the onboard device 12.

The onboard device 12, for example, may include the detector 22 and detect the landmarks L from the captured image for position specification 900. With this configuration, the transmitter 122 may transmit, to the information processing device 2, the captured image for position information 900, the coordinates indicating the position of the landmark L detected from the captured image for position information 900, the imaging time, and the GPS positional information in a manner associated with one another only when the landmark L is detected. The processing performed by the onboard device 12 described above is given by way of example only, and the present modification is not limited thereto.

Second Modification

The first embodiment does not find out in advance how large the difference between the imaging angle of the captured image for position specification 900 and the standard imaging angle is. As a result, the converter 24 according to the first embodiment generates the imaging landmark information resulting from conversion of the imaging angle corresponding to each of a plurality of conversion angles registered in the imaging angle conversion information 203.

If the difference between the imaging angle of the captured image for position specification 900 and the standard imaging angle is found out in advance, the converter 24 may convert the imaging landmark information into the imaging landmark information obtained by imaging at the standard imaging angle. The difference between the imaging angle of the captured image for position specification 900 and the standard imaging angle may be stored in the storage 200 in advance, for example.

More specifically, the converter 24 according to the present modification acquires the conversion angle equal to the difference between the imaging angle of the captured image for position specification 900 and the standard imaging angle from the imaging angle conversion information 203. The converter 24 converts the coordinates indicating the image range in which the landmark L is displayed in the captured image for position specification 900 into the coordinates obtained by imaging at the standard angle using the acquired conversion angle. With this configuration, the converter 24 need not generate the imaging landmark information for each of the conversion angles. Consequently, the present modification requires a lower processing load.

Third Modification

If there is a running section in which the position of the tram 1 fails to be specified using the imaging landmark information, the position specifier 25 according to the present modification specifies the position of the tram 1 in the running section based on the positions specified before and after the section using the imaging landmark information and on the movement amount of the tram 1.

More specifically, the position specifier 25 calculates the movement distance and the movement direction of the tram 1 from the rotation speed of a wheel acquired from a wheel speed sensor, which is not illustrated, the circumference of the wheel set in advance, and the steering angle acquired from a steering angle sensor, which is not illustrated, for example. The method for calculating the movement amount of the tram 1 is not limited thereto. The position specifier 25 specifies the running position of the tram 1 based on the position specified using the imaging landmark information and on the distance and the direction in which the tram 1 moves the position.

The position specifier 25 may possibly be able to specify the position of the tram 1 using the imaging landmark information again after the running section in which the position of the tram 1 fails to be specified. In such a case, the running position of the tram 1 specified based on the movement amount may possibly be different from the position of the tram 1 specified using the imaging landmark information again. In this case, the position specifier 25 may correct the information on the running position of the tram 1 specified based on the movement amount with the position specified using the imaging landmark information.

Second Embodiment

The information processing device according to the present embodiment deletes or adds information from or to the landmark DB 201 corresponding to vanishment and appearance of a landmark, for example.

The entire configuration of the information processing system according to the present embodiment is the same as the configuration according to the first embodiment described with reference to FIGS. 1 to 4. The hardware configuration of the onboard device and the information processing device according to the present embodiment is the same as that according to the first embodiment.

Figure 11:
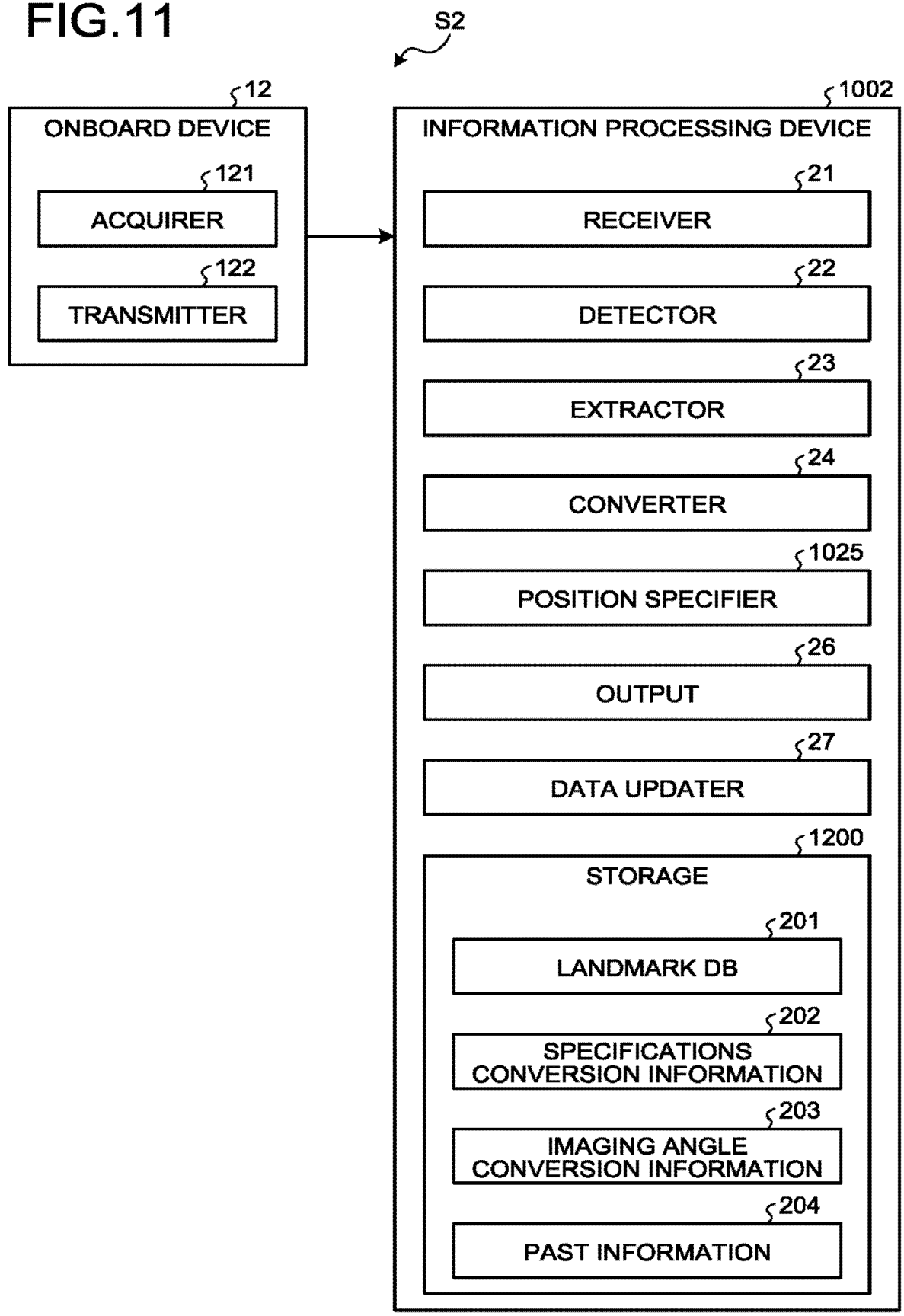
FIG. 11 is a diagram of an exemplary functional configuration of the onboard device and the information processing device according to a second embodiment.

FIG. 11 is a diagram of an exemplary functional configuration of the onboard device 12 and an information processing device 1002 according to the present embodiment. Similarly to the first embodiment, the onboard device 12 of an information processing system 32 according to the present embodiment includes the acquirer 121 and the transmitter 122. The functions of the acquirer 121 and the transmitter 122 are the same as those according to the first embodiment.

The information processing device 1002 according to the present embodiment includes the receiver 21, the detector 22, the extractor 23, the converter 24, a position specifier 1025, the output 26, a data updater 27, and a storage 1200.

The receiver 21, the detector 22, the extractor 23, the converter 24, and the output 26 have the same functions as those according to the first embodiment.

The storage 1200 stores therein the landmark DB 201, the specifications conversion information 202, the imaging angle conversion information 203, and past information 204. The landmark DB 201, the specifications conversion information 202, and the imaging angle conversion information 203 are the same as those according to the first embodiment.

The past information 201 chronologically stored information on the captured image for position specification 900 received by the information processing device 1002 in the past. The past information 204 according to the present embodiment has the captured image for position specification 900, the imaging time of the captured image for position specification 900, the position of the tram 1 at the imaging time of the captured image for position specification 900 (hereinafter, referred to as the position of the tram 1), and the imaging landmark information extracted from the captured image for position specification 900 associated with one another.

The position of the tram 1 in the past information 204 is the position specified by the position specifier 1025 if the position specifier 1025 specifies the position or the GPS positional information if the position specifier 1025 does not specify the position. The imaging landmark information is imaging landmark information resulting from conversion into a state according to the standard specifications by the converter 24.

The information stored as the past information 204 is not limited to the information described above. The past information 204 may be stored in an external device connected to the information processing device 1002, for example.

The position specifier 1025 has the functions according to the first embodiment. In addition, the position specifier 1025 stores, in the storage 1200, the captured image for position specification 900, the imaging time of the captured image for position specification 900, the position of the tram 1 at the imaging time of the captured image for position specification 900, and the imaging landmark information extracted from the captured image for position specification 900 in a manner associated with one another as the past information 204.

If the landmark L displayed in the captured image for registration 901 taken at the same position as the position where the captured image for position specification 900 is taken is no longer detected from the captured image for position specification 900, the data updater 27 deletes, from the landmark DB 201, the registration landmark information on the landmark L that is no longer detected.

More specifically, the data updater 27 refers to the past information 204 and the landmark DB 201. The data updater 27 compares a combination of the imaging positional information and the registration landmark information registered in the landmark DB 201 with a combination of the position of the tram 1 and the imaging landmark information in the past information 204. If the data updater 27 simply compares the registration landmark information and the imaging landmark information, it may possibly erroneously determine similar landmarks L present at different positions to be identical. To address this, the data updater 27 compares the registration landmark information and the imaging landmark information having the same positional information and the same position of the tram 1.

The past information 204 used for comparison is a ted with the captured image for position specification 900 taken in a certain past period. The certain period is one month, for example, but is not limited thereto.

If there is registration landmark information not agreeing with any one piece of the imaging landmark information, the data updater 27 determines that the landmark L indicated by the registration landmark information is no longer detected. In this case, the data updater 27 deletes the registration landmark information from the landmark DB 201.

The state of "not agreeing with any one piece of the imaging landmark information" indicates a state where the landmark L is not detected from any one of a plurality of captured images for position specification 900 taken at the same position (the position of the tram 1 in the past information 204) in the predetermine period.

If a landmark L not registered in the storage 1200 is detected from a plurality of captured images for position specification 900 taken at the same position by the imaging device 11, the data updater 27 registers (adds) the registration landmark information indicating the characteristics of the landmark L in the storage 1200.

More specifically, the data updater 27 refers to the past information 204 and the landmark DB 201. The data updater 27 compares a combination of the imaging positional information and the registration landmark information stored in the landmark DB 201 with a combination of the position of the tram 1 and the imaging landmark information in the past information 204.

If there is imaging landmark information not agreeing with any one piece of the registration landmark information associated with the positional information indicating the same position as the position of the tram 1 in the past information 204, the data updater 27 determines that the landmark L indicated by the imaging landmark information is newly detected. If the number of times the imaging landmark information has been extracted is equal to or larger than a threshold, the data updater 27 registers the imaging landmark information in the landmark DB 201 as the registration landmark information in a manner associated with the positional information indicating the same position as the position of the tram 1 in the past information 204 and the landmark set number associated with the positional information.

The threshold of the number of times the imaging landmark information has been extracted is set to prevent a temporarily placed structure, a movable object, and other structures from being registered. The threshold may be appropriately set depending on the operation conditions of the tram 1, the environment of the surroundings, and other conditions.

If the past information 204 stores therein a plurality of pieces of imaging landmark information associated with the position of the tram 1 not agreeing with the positional information registered in the landmark DB 201, the data updater 27 may generate and register a new landmark set number in the landmark DB 201. The pieces of imaging landmark information indicate that a plurality of pieces of imaging landmark information are extracted from the same captured image for position registration 900.

In this case, the data updater 27 generates a landmark set number yet to be registered in the landmark DB 201 as a new landmark set number. The data updater 27 registers the new landmark set number, the position of the tram 1 stored in the past information 204, and the nieces of imaging landmark information extracted from the captured image for position registration 900 taken at the position of the tram 1 in a manner associated with one another as the landmark set number, the imaging positional information, and the registration landmark information, respectively, in the landmark DB 201.

The process of position specification according to the present embodiment is the same as that according to the first embodiment described with reference to FIG. 10.

Figure 12:
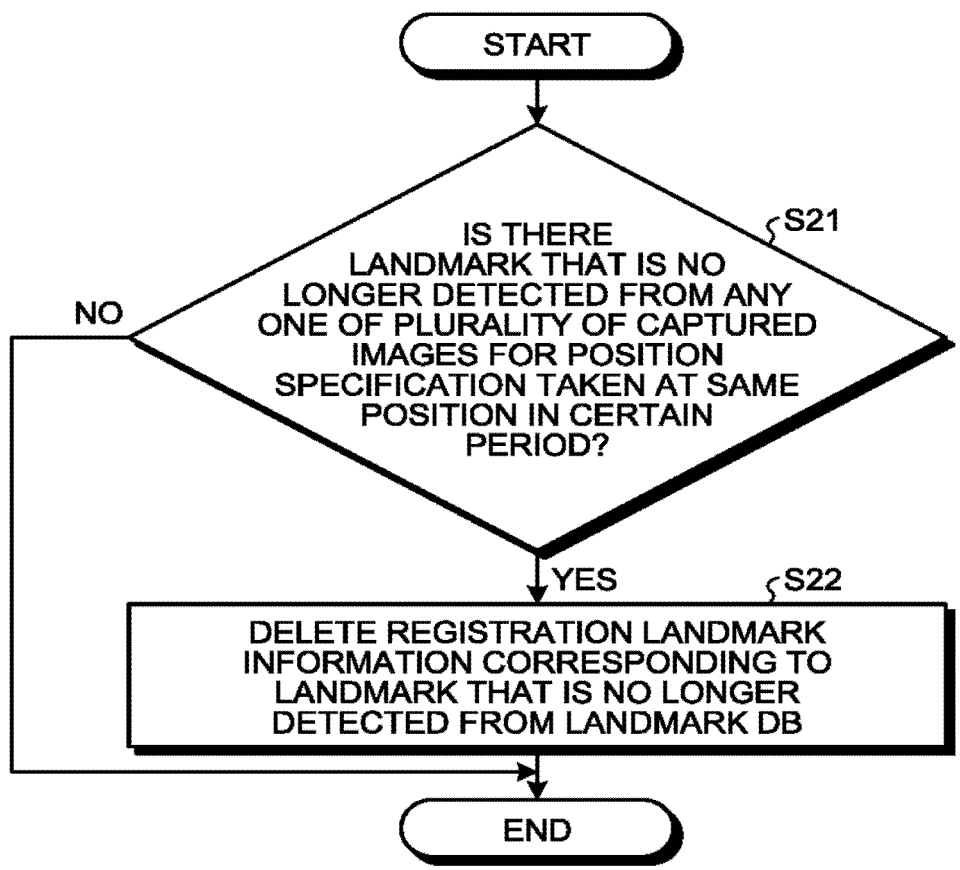
FIG. 12 is a flowchart of an exemplary process of deleting registration landmark information in the second embodiment.

The following describes processing of deleting the registration landmark information from the landmark DB 201 according to the present embodiment. FIG. 12 is a flowchart of an exemplary process of deleting the registration landmark information according to the present embodiment.

First, the data updater 27 refers to the past information 204 and the landmark DB 201. The data updater 27 determines whether there is a landmark L that is no longer detected from any one of a plurality of captured images for position specification 900 taken at the same position (position of the tram 1 in the past information 204) in a certain period (S21).

If there is a landmark L that is no longer detected from any one of the captured images for position specification 900 taken at the same position in the certain period ("Yes" at 221), the data updater 27 deletes, from the landmark DB 201, the registration landmark information corresponding to the landmark that is no longer detected (S22).

If there is no landmark L that is no longer detected from any one of the captured images for position specification 900 taken at the same position in the certain period ("No" at S21), the processing of the flowchart is ended.

Figure 13:
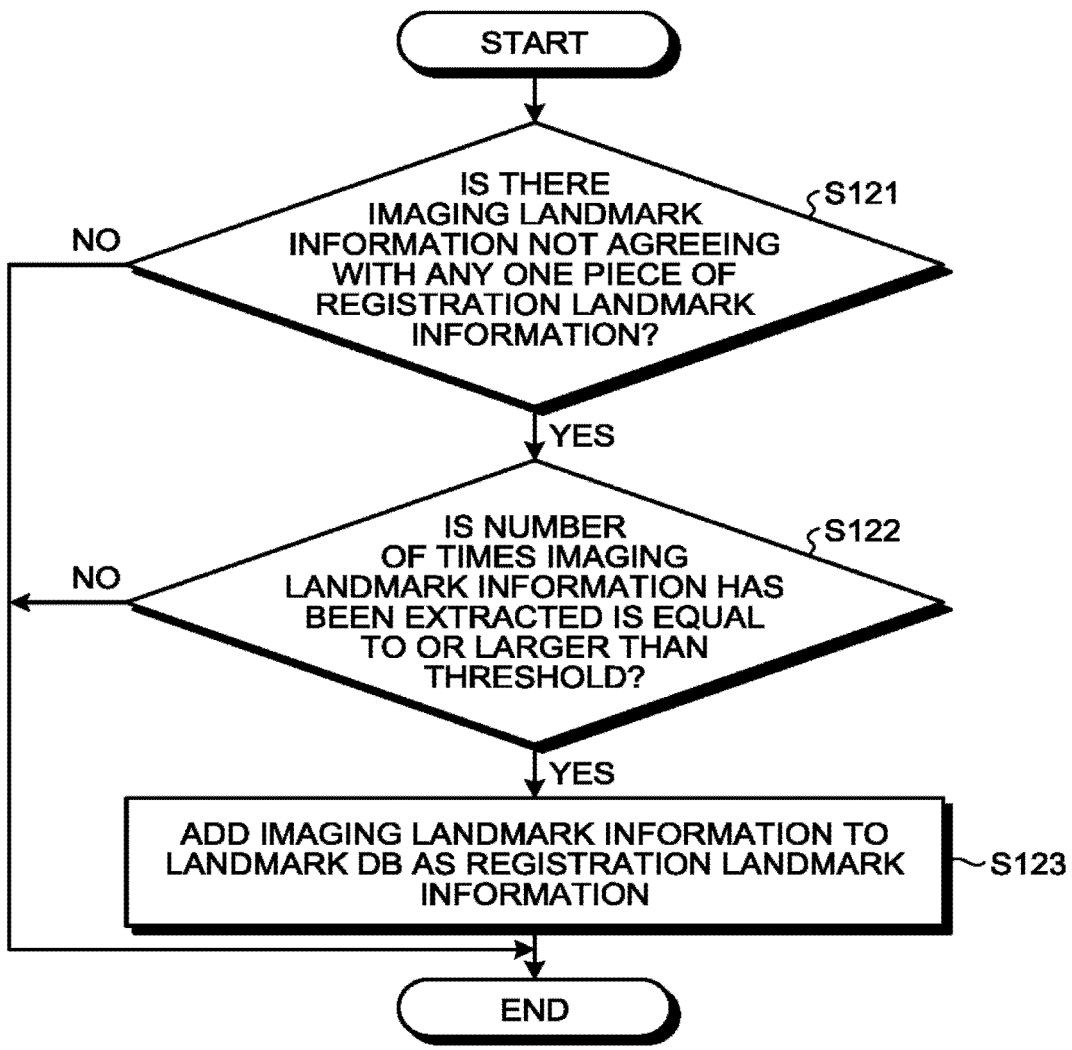
FIG. 13 is a flowchart of an exemplary process of adding registration landmark information in the second embodiment.

The following describes processing of adding the registration landmark information to the landmark DB 201 according to the present embodiment. FIG. 13 is a flowchart of an exemplary process of adding the registration landmark information according to the present embodiment.

First, the data updater 27 refers to the past information 204 and the landmark DB 201 and determines whether there is imaging landmark information not agreeing with any one piece of the registration landmark information (S121). The state where "imaging landmark information does not agree with any one piece of the registration landmark information" indicates a state where imaging landmark information does not agree with any one piece of the registration landmark information associated with the positional information indicating the same position as the position of the tram 1 associated with the imaging landmark information. The data updater 27 determines that "imaging landmark information does not agree with any one piece of the registration landmark information" also in a case where the position of the tram 1 associated with the imaging landmark information does not agree with any one piece of the positional information registered in the landmark DB 201.

If there is imaging landmark information not agreeing with any one piece of the registration landmark information ("Yes" at S121), the data updater 27 determines whether the number of times the imaging landmark information has been extracted is equal to or larger than a threshold (S122).

If the number of times the imaging landmark information has been extracted is equal to or larger than the threshold ("Yes" at S122), the data updater 27 adds the imaging landmark information to the landmark DB 201 as the registration landmark information (S123).

More specifically, if the imaging landmark information does not agree with any one piece of the registration landmark information associated with the positional information indicating the same position as the position of the tram 1 in the past information 204, the data updater 27 adds the imaging landmark information as the registration landmark information in a manner associated with the landmark set number and the imaging positional information already registered in the landmark DB 201. If the position of the tram 1 associated with the imaging landmark information does not agree with any one piece of the positional information registered in the landmark DB 201, the data updater 27 adds, to the landmark DB 201, a new landmark set number, the position of the tram 1 stored in the past information 204, and a plurality of pieces of imaging landmark information extracted from the captured image for position specification 900 taken at the position of the tram 1 in a manner associated with one another.

If there is no imaging landmark information not agreeing with any one piece of the registration landmark information ("No" at S121) or if the number of times the imaging landmark information not agreeing with any one piece of the registration landmark information has been extracted is smaller than the threshold ("No" at S122), the processing of the flowchart is ended.

The processing of the flowcharts illustrated in FIGS. 12 and 13 may be performed regularly in every fixed period, for example.

As described above, the information processing device 1002 according to the present embodiment deletes, from the landmark DB 201, the registration landmark information on the landmark L that is no longer detected. If the landmark L is vanished, for example, the information processing device 1002 can update the landmark DB 201 in a manner reflecting the actual state. Consequently, the information processing device 1002 according to the present embodiment can reduce the work load of the administrator and other persons of collecting the information that a sign or the like used as the landmark L is removed and deleting the registration landmark information from the landmark DB 201.

If a landmark L not registered in the landmark DB 201 is detected, the information processing device 1002 according to the present embodiment registers the registration landmark information indicating the characteristics of the landmark L in the landmark DB 201. Consequently, the information processing device 1002 according to the present embodiment can reduce the work load of the administrator and other persons of collecting information on a newly placed sign, a newly constructed building, or the like and adding the information to the landmark DB 201.

Third Embodiment

The present embodiment describes an example where the information processing system according to the present embodiment is applied to a probe vehicle that runs on roads. The probe vehicle is an example of the vehicle according to the present embodiment.

Similarly to the first embodiment, the information processing system according to the present embodiment includes an onboard device and an information processing device 2002. The onboard device according to the present embodiment is mounted on the probe vehicle. The probe vehicle includes the imaging device 11 and the GPS receiver 16. The hardware configuration of the onboard device and the information processing device according to the present embodiment is the same as that according to the first embodiment.

Figure 14:
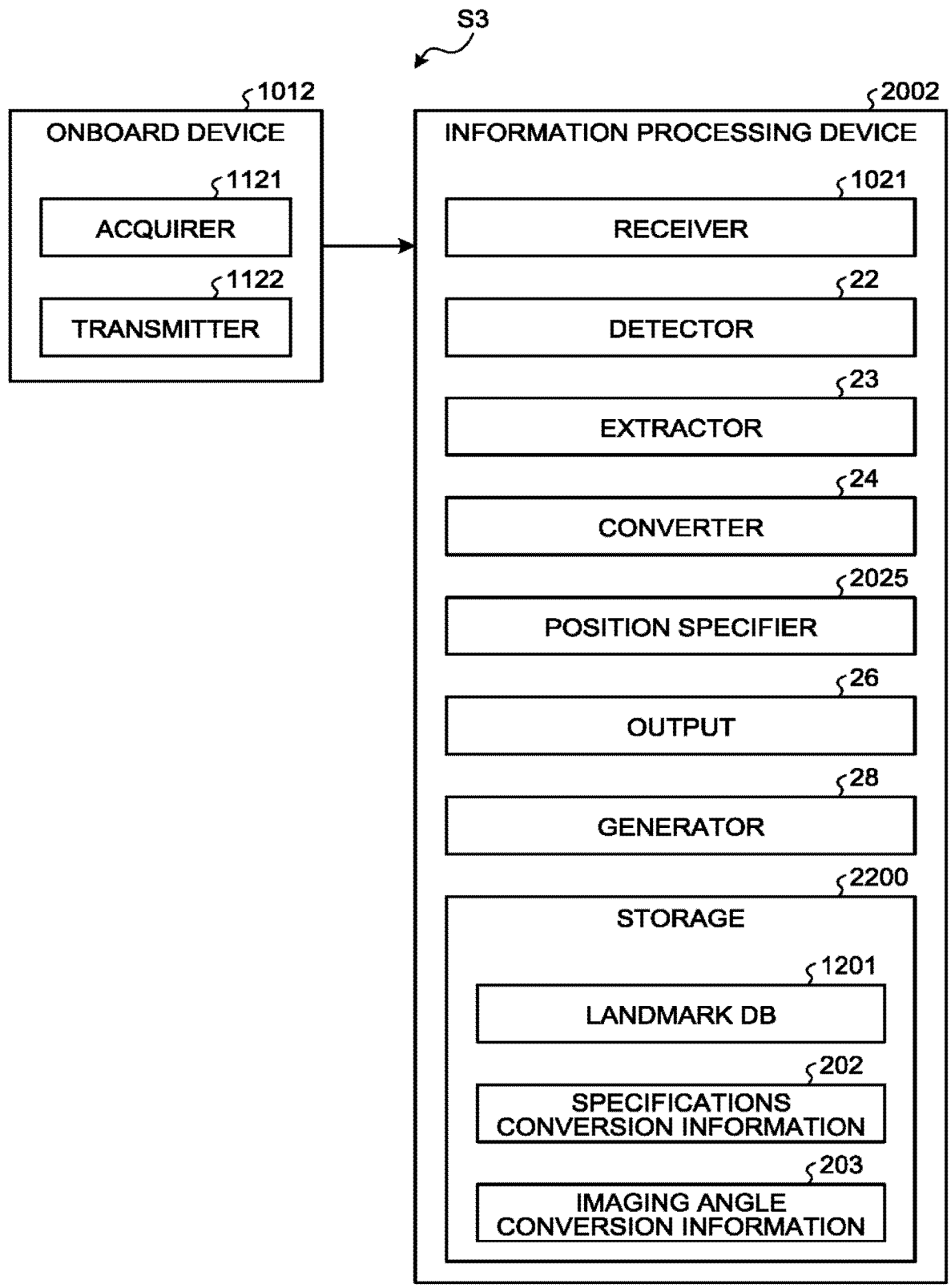
FIG. 14 is a diagram of an exemplary functional configuration of the onboard device and the information processing device according to a third embodiment.

FIG. 14 is a diagram of an exemplary functional configuration of an onboard device 1012 and the information processing device 2002 according to the present embodiment. The onboard device 1012 of an information processing system S3 according to the present embodiment includes an acquirer 1121 and a transmitter 1122.

The acquirer 1121 according to the present embodiment has the functions according to the first embodiment. In addition, the acquirer 1121 acquires the direction in which the imaging device 11 provided to the probe vehicle faces. If the imaging device 11 is disposed at the front part of the probe vehicle, for example, the direction in which the probe vehicle faces corresponds to the direction in which the imaging device 11 faces. In this case, the acquirer 1121 calculates a traveling direction of the probe vehicle based on a change in the GPS positional information. The acquirer 1121 acquires the traveling direction as the direction in which the probe vehicle that is, the direction in which the imaging device 11 faces.

If the imaging device 11 is disposed facing in the rear, the side, or the oblique direction with respect to the probe vehicle, for example, the acquirer 1121 may calculate the direction in which the probe vehicle faces based on the GPS positional information and then convert the direction based on the difference between the direction and the direction in which the imaging device 11 faces. The difference between the direction in which the probe vehicle faces and the direction in which the imaging device 11 faces may be stored in advance in a storage, which is not illustrated, for example. The method for deriving the direction in which the imaging device 11 faces is not limited thereto, and an acceleration sensor or the like, which is not illustrated, may be used.

The transmitter 1122 according to the present embodiment has the functions according to the first embodiment. In addition, the transmitter 1122 transmits direction information indicating the direction in which the imaging device 11 in the probe vehicle faces acquired by the acquirer 1121 to the information processing device 2002.

The information processing device 2002 according to the present embodiment includes a receiver 1021, the detector 22, the extractor 23, the converter 24, a position specifier 2025, the output 26, a generator 28, and a storage 2200.

The detector 22, the extractor 23, the converter 24, and the output 26 have the same functions as those according to the first embodiment.

The storage 2200 stores therein a landmark DB 1201, the specifications conversion information 202, and the imaging angle conversion information 203. The specifications conversion information 202 and the imaging angle conversion information 203 are the same as those according to the first embodiment.

The landmark DB 1201 according to the present embodiment has information for direction conversion besides the information described in the first embodiment.

FIG. 15 is a diagram of an exemplary data configuration of the landmark DB 1201 according to the present embodiment. As illustrated in FIG. 15, the landmark DB 1201 has the information for direction conversion including a reference direction, a point-of-view number, direction associated with the point-of-view number, and a direction conversion parameter for each point-of-view number. The reference direction is a direction in which the imaging device 11 faces when the information to be registered in the landmark DB 1201 is collected. The registration landmark information registered in the landmark DB 1201 is information extracted from the captured image for registration 901 taken by the imaging device 11 facing in the reference direction.

The direction conversion parameter is information for converting the registration landmark information extracted from the captured image for position specification 900 taken by the imaging device 11 facing in the reference direction into the registration landmark information obtained by the imaging device 11 facing in a different direction.

While the number of point-of-view numbers associated with one landmark set number is two in the example illustrated in FIG. 15, the present embodiment is not limited thereto. While the directions are denoted by the names of 16 compass points, such as north-northwest, in FIG. 15, numbers indicating the azimuths may be registered.

The landmark set number, the imaging positional information, and the registration landmark information in the landmark DB 1201 are the same as those according to the first embodiment. The data configuration of the landmark DB 1201 illustrated in FIG. 15 given by way of example only, and the present embodiment is not limited thereto. The information for direction conversion, for example, may be provided as another database.

The imaging device 11 provided to the probe vehicle may possibly photograph the landmark L from various points of view unlike the tram 1 that runs on the dedicated lane EL. The directions in which the imaging devices 11 of a plurality of probe vehicles face, for example, may possibly be different even if the GPS positional information on the probe vehicles is the same. The directions in which the imaging devices 11 of the probe vehicles face are different if the positions of the probe vehicles on the road are different or if the installation angles of the imaging devices 11 are different.

Figure 16:
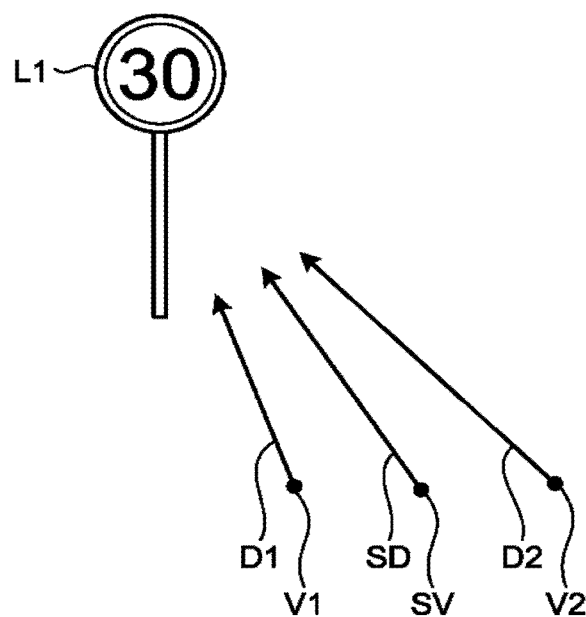
FIG. 16 is a diagram of an example of different directions in the third embodiment.

FIG. 16 is a diagram of an example of different directions according to the present embodiment. A reference direction SD illustrated in FIG. 16 is a direction in which the landmark L1 is photographed from a point of view serving as a reference (reference point of view SV). The reference point of view DV is a point of view of the probe vehicle when the information to be registered in the landmark DB 1201 is collected. A point of view V1 corresponds to the point-of-view number "1" in the landmark DB 1201 in FIG. 15. A point of view V2 corresponds to the point-of-view number "2". A direction D1 is an imaging direction of the imaging device 11 when the imaging device 11 photographs the landmark L1 from the point of view with the point-of-view number "1". A direction D2 is an imaging direction of the imaging device 11 when the imaging device 11 photographs the landmark L1 from the point of view with the point-of-view number "2".

The receiver 1021 according to the present embodiment has the functions according to the first embodiment. In addition, the receiver 1021 receives the direction information indicating the direction in which the imaging device 11 provided to the probe vehicle faces from the onboard device 1012.

The generator 23 generates the registration landmark information obtained when the captured image for registration 901 is taker in the direction indicated by the direction information received by the receiver 1021 from the registration landmark information registered in the landmark DB 1201. If the direction indicated by the direction information received by the receiver 1021 is different from the reference direction registered in the landmark DB 1201, for example, the generator 20 searches for a direction agreeing with the direction information out of the directions corresponding to the respective points of view. The generator 28 generates the registration landmark information obtained by imaging in the direction indicated by the direction information using the direction conversion parameter associated with the direction identical with direction indicated by the direction information received by the receiver 1021.

The position specifier 2025 according to the present embodiment has the functions according to the first embodiment. In addition, the position specifier 2025 specifies the position indicated by the imaging positional information associated the landmark set including the registration landmark information similar to the imaging landmark information and generated by the generator 28 as the position of the probe vehicle at the time when the captured image for position specification 900 is taken. If the direction indicated by the direction information received by the receiver 1021 is the same as the reference direction registered in the landmark DB 1201, the position specifier 2025 uses the registration landmark information registered in the landmark DB 1201 for comparison with the imaging landmark information.

Figure 17:
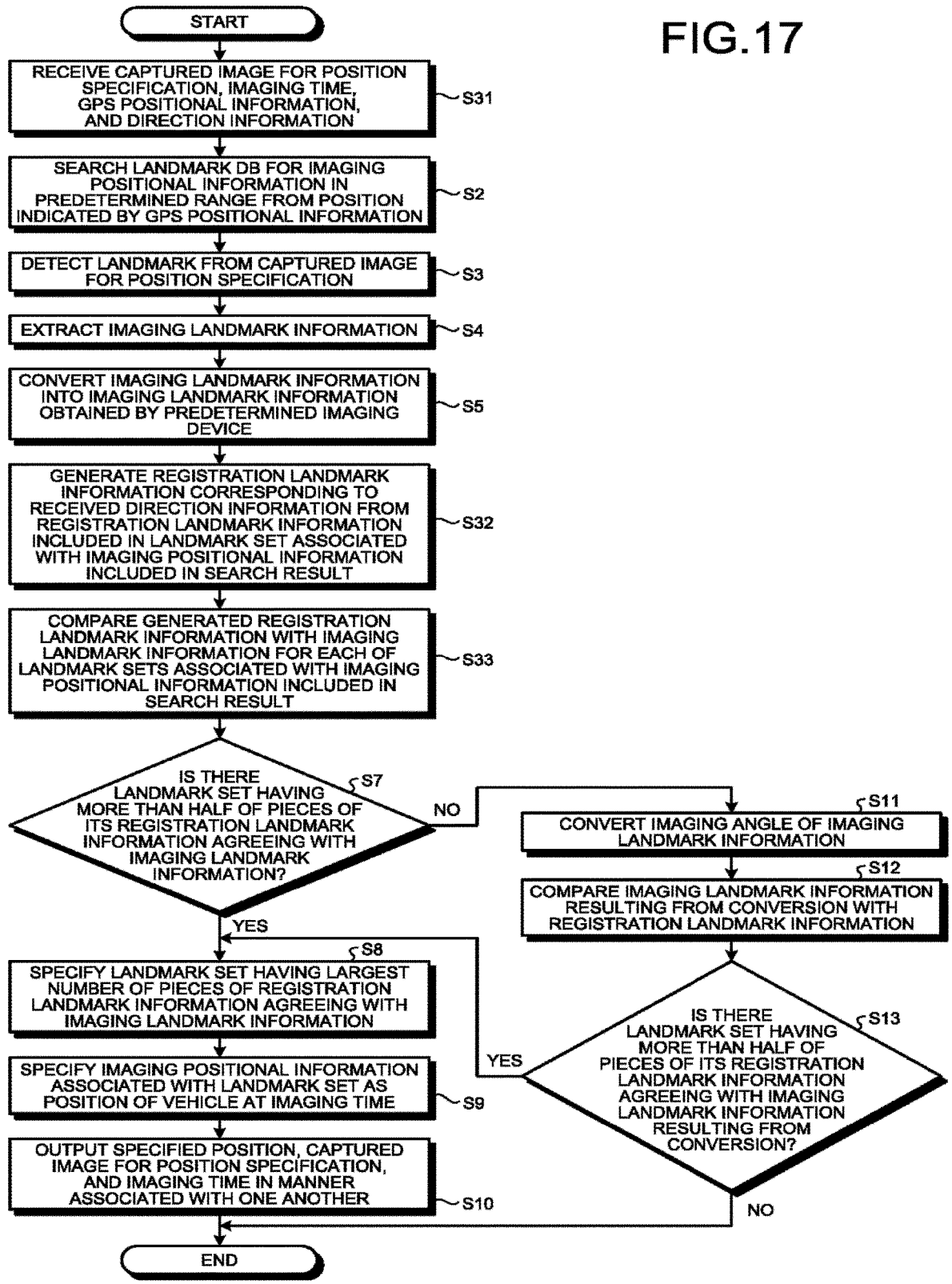
FIG. 17 is a flowchart of an exemplary process of position specification in the third embodiment.

The following describes position specification according to the present embodiment. FIG. 17 is a flowchart of an exemplary process of position specification according to the present embodiment.

The receiver 1021 receives, from the onboard device 1012, the captured image for position specification 900, the imaging time of the captured image for position specification 900, the GPS positional information at the imaging time of the captured image for position specification 900, and the direction information indicating the direction in which the imaging device 11 provided to the probe vehicle faces at the imaging time of the captured image for position specification 900 (S31).

The contents of the processing of searching the landmark DB 1201 at S2 to the processing of conversion at S5 are the same as those according to the first embodiment.

The generator 28 generates the registration landmark information corresponding to the direction information received by the receiver 1021 from the registration landmark information included in the landmark set associated with the imaging positional information included in the search result of the processing at S2 using the direction conversion parameter associated with the direction identical with the direction indicated by the received direction information (S32).

The position specifier 2025 compares the registration landmark information generated by the generator 28 with the imaging landmark information resulting from conversion by the converter 24 for each of the landmark sets associated with the imaging positional information included in the search result of the processing at S2 (S33). The position specifier 2025 uses the registration landmark information registered in the landmark DB 1201 without any change for a record having the received direction information identical with the reference direction out of the records in the landmark DB 1201 included in the search result of the processing at S2.

The contents of the processing of determining whether there is a landmark set having more than half of the pieces of its registration landmark information agreeing with the imaging landmark information at S7 to the processing of comparing the imaging landmark information resulting from converting the imaging angle with the registration landmark information again at S13 are the same as those according to the first embodiment.

As described above, the information processing device 2002 according to the present embodiment generates the registration landmark information obtained when the captured image for registration 901 is taken in the direction in which the imaging device 11 provided to the probe vehicle faces. Consequently, the information processing device 2002 according to the present embodiment can specify the position of the probe vehicle with high accuracy if the imaging device 11 provided to the probe vehicle photographs the landmark L from various points of view.

The information processing device 2002 according to the present embodiment generates the registration landmark information corresponding to the direction in which the imaging device 11 faces. As a result, the information processing device 2002 need not register in advance the registration landmark information in each direction in the landmark DB 1201. Consequently, the information processing device 2002 requires smaller data capacity of the landmark DB 1201.

Fourth Modification

To perform comparison with the imaging landmark information, the third embodiment generates the registration landmark information corresponding to the direction in which the imaging device 11 faces. The present modification registers in advance the registration landmark information in each direction in the landmark DB 1201.

In the present modification, when the detector 22 searches the landmark DB 1201 for the imaging positional information included in the certain range from the position indicated by the GPS positional information received by the receiver 1021, the detector 22 also searches for the direction agreeing with the direction information received by the receiver 1021. The present modification narrows down the information registered in the landmark DB 1201 based on the imaging positional information and the direction, thereby reducing the number of landmark sets included in the search result.

The information processing device 2002 according to the present embodiment thus reduces the number of pieces of registration landmark information to be compared with the imaging landmark information. Consequently, the information processing device 2002 requires a lower processing load.

As described above, the first to the third embodiments can specify the position of the tram 1 or the probe vehicle with high accuracy.

A position specification program executed in the information processing devices 2, 1002, and 2002 according to the embodiments above is recorded and provided in a computer-readable recording medium, such as a compact disc read only memory (CD-ROM), a flexible disk (FD), a compact disc recordable (CD-R), and a digital versatile disc (DVD), as an installable or executable file.

The position specification program executed in the information processing devices 2, 1002, and 2002 according to the embodiments above may be stored in a computer connected to a network, such as the Internet, and provided by being downloaded via the network. The position specification program executed in information processing devices 2, 1002, and 2002 according to the embodiments above may be provided or distributed via a network, such as the Internet. The position specification program according to the embodiments above may be embedded and provided in a ROM, for example.

The position specification program executed in the information processing devices 2, 1002, and 2002 according to the embodiments above has a module configuration including the units described above (the receiver, the detector, the extractor, the converter, the position specifier, the output, the data updater, and the generator). In actual hardware, the CPU (processor) reads and executes the position specification program from the storage medium described above to load the units described above on a main memory. As a result, the receiver, the detector, the extractor, the converter, the position specifier, the output, the data updater, and the generator are generated on the main memory.

A computer program executed in the onboard devices 12 and 1012 according to the embodiments above is embedded and provided in a ROM, for example. The computer program executed in the onboard devices 12 and 1012 according to the embodiments above may be recorded and provided in a computer-readable recording medium, such as a CD-ROM, an FD, a CD-R, and a DVD, as an installable or executable file.

The computer program executed in the onboard devices 12 and 1012 according to the embodiments above may be stored in a computer connected to a network, such as the Internet, and provided by being downloaded via the network. Furthermore, the computer program executed in the onboard devices 12 and 1012 according to the embodiments above may be provided or distributed via a network, such as the Internet.

The computer program executed in the onboard devices 12 and 1012 according to the embodiments above has a module configuration including the units described above (the acquirer and the transmitter). In actual hardware, the CPU (processor) reads and executes the computer program from the ROM to load the units described above on a main memory. As a result, the acquirer and the transmitter are generated on the main memory.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing device comprising:
a memory that stores therein, imaging positional information indicating a position at a time when a captured image for registration is taken in advance by a first imaging device mounted on a first vehicle, identification information on a landmark set serving as a combination of a plurality of landmarks displayed in the captured image for registration, registration landmark information serving as information on each of the landmarks included in the landmark set, in association with one another, and imaging angle conversion information including a conversion angle and an imaging angle conversion parameter associated with each other;
a receiver that receives a captured image for position specification taken by a second imaging device mounted on a second vehicle from an onboard device mounted on the second vehicle;
a computer processor configured with instructions to operate as:
a detector that detects a landmark displayed in the captured image for position specification;
an extractor that extracts an imaging landmark information serving as information on the detected landmark from the captured image for position specification;
a converter that converts, based on the imaging angle conversion information, the imaging landmark information extracted by the extractor into converted imaging landmark information obtained at a different imaging angle of the captured image for position specification; and a
position specifier that specifies the position indicated by the imaging positional information associated with the identification information on the landmark set including the registration landmark information similar to the converted imaging landmark information as the position of the second vehicle at a time when the captured image for position specification is taken,
wherein the computer processor further comprises instructions for determining:
when any of a plurality of pieces of the registration landmark information has or have vanished, but when one half or more of pieces of the registration landmark information out of a plurality of remaining pieces of the registration landmark information included in the landmark set agree with the converted imaging landmark information, the position specifier specifies the position indicated by the imaging positional information associated with the identification information on the landmark set as the position of the second vehicle at the time when the captured image for position specification is taken,
and when less than the one half or more pieces of the registration landmark information out of the plurality of remaining pieces of the registration landmark information included in the landmark set do not agree with the converted imaging landmark information, the converter converts the imaging angle before a next specifying by the position specifier.

2. The information processing device according to claim 1, wherein
the registration landmark information includes any one of a shape, a color, a pattern, and a character of the landmark displayed in the captured image for registration and coordinates indicating a range in which the landmark is displayed on the captured image for registration,
the imaging positional information is a latitude and a longitude indicating the position,
the imaging landmark information and the converted imaging landmark information include any one of a shape, a color, a pattern, and a character of the landmark displayed in the captured image for position specification and coordinates indicating a range in which the landmark is displayed on the captured image for position specification, and
the position specifier determines whether any one of the shape, the color, the pattern, and the character of the landmark and the coordinates included in the registration landmark information and the converted imaging landmark information are similar to each other and specifies the latitude and the longitude associated with the identification information on the landmark set including the registration landmark information similar to the converted imaging landmark information as the position of the second vehicle at the time when the captured image for position specification is taken.

3. The information processing device according to claim 1, further comprising a data updater that deletes, when the landmark displayed in the captured image for registration taken at the same position as the position where the captured image for position specification is taken is no longer detected from the captured image for position specification, the registration landmark information on the landmark that is no longer detected from the memory.

4. The information processing device according to claim 3, wherein the data updater registers, when the landmark not registered in the memory is detected from a plurality of the captured images for position specification taken at the same position by the second imaging device, the registration landmark information indicating characteristics of the landmark in the memory.

5. The information processing device according to claim 1, wherein
the first vehicle and the second vehicle are probe vehicles,
the receiver further receives information indicating a direction in which the second imaging device, provided to the second probe vehicle, faces,
a generator is further provided, the generator generating, when the direction indicated by the information received by the receiver is different from a direction in which the first imaging device, that takes the captured image for registration, faces, generated registration landmark information obtained when the captured image for registration is taken in the direction for the registration landmark information stored in the memory, and
the position specifier specifies the position indicated by the imaging positional information associated with the identification information on the landmark set including the generated registration landmark information similar to the converted imaging landmark information as the position of the second vehicle at the time when the captured image for position specification is taken.

6. The information processing device according to claim 1, wherein the imaging positional information is a latitude and a longitude calculated statistically from results of measuring GPS positional information by a GPS receiver a plurality of times on a same course.

7. The information processing device according to claim 1, wherein
the converter converts the imaging landmark information extracted by the extractor into the imaging landmark information obtained by the first imaging device that takes the captured image for registration when specifications of the second imaging device that takes the captured image for position specification are different from specifications of the first imaging device that takes the captured image for registration.

8. An information processing system including an onboard device and an information processing device connected to the onboard device via a network, the information processing system comprising:
a memory that stores therein, imaging positional information indicating a position at time when a captured image for registration is taken in advance by a first imaging device mounted on a first vehicle, identification information on a landmark set serving as a combination of a plurality of landmarks displayed in the captured image for registration, registration landmark information serving as information on each of the landmarks included in the landmark set, in association with one another, and imaging angle conversion information including a conversion angle and an imaging angle conversion parameter associated with each other;
a computer processor configured with instructions to operate as:
a detector that detects the landmark displayed in a captured image for position specification taken by a second imaging device mounted on a second vehicle;
an extractor that extracts an imaging landmark information serving as information on the detected landmark from the captured image for position specification;
a converter that converts, based on the imaging angle conversion information, the imaging landmark information extracted by the extractor into converted imaging landmark information obtained at a different imaging angle of the captured image for position specification;
a position specifier that specifies the position indicated by the imaging positional information associated with the identification information on the landmark set including the registration landmark information similar to the converted imaging landmark information as the position of the second vehicle at a time when the captured image for position specification is taken,
wherein the computer processor further comprises instructions for determining:
when any of a plurality of pieces of the registration landmark information has or have vanished, but when one half or more of pieces of the registration landmark information out of a plurality of remaining pieces of the registration landmark information included in the landmark set agree with the converted imaging landmark information, the position specifier specifies the position indicated by the imaging positional information associated with the identification information on the landmark set as the position of the second vehicle at the time when the captured image for position specification is taken, and when less than the one half or more pieces of the registration landmark information out of the plurality of remaining pieces of the registration landmark information included in the landmark set do not agree with the converted imaging landmark information, the converter converts the imaging angle before a next specifying by the position specifier.

9. The information processing system according to claim 8, wherein the imaging positional information is a latitude and a longitude calculated statistically from results of measuring GPS positional information by a GPS receiver a plurality of times on a same course.

* * * * *